United States Patent
Su et al.

(10) Patent No.: US 6,746,005 B1
(45) Date of Patent: Jun. 8, 2004

(54) CONSTANT NATURAL FREQUENCY PASSIVE-ACTIVE MOUNT

(75) Inventors: Jen-Houne Hannsen Su, Centreville, VA (US); Robert Joseph Gallant, Rockville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 75 days.

(21) Appl. No.: 09/972,292

(22) Filed: Oct. 4, 2001

(51) Int. Cl.[7] .............................. F16F 13/00; F16M 1/00
(52) U.S. Cl. .................. 267/140.14; 267/136; 248/638
(58) Field of Search ................... 267/140.14, 140.15, 267/136, 219, 292; 188/378, 379, 380; 248/550, 636, 638

(56) References Cited

U.S. PATENT DOCUMENTS

| | | | |
|---|---|---|---|
| 3,606,233 A | * | 9/1971 | Scharton et al. ............ 248/550 |
| 3,947,004 A | | 3/1976 | Taylor |
| 3,997,151 A | | 12/1976 | Leingang |
| 4,218,187 A | | 8/1980 | Madden |
| 4,384,701 A | | 5/1983 | Barley |
| 4,452,329 A | | 6/1984 | Stone et al. |
| 4,509,730 A | | 4/1985 | Shtarkman |
| 4,619,467 A | | 10/1986 | Lafferty |
| 4,880,201 A | | 11/1989 | Hall et al. |
| 5,016,862 A | | 5/1991 | Leyshon |
| 5,116,029 A | * | 5/1992 | Gennesseaux ......... 267/140.14 |
| 5,133,527 A | * | 7/1992 | Chen et al. ................ 248/550 |
| 5,251,863 A | * | 10/1993 | Gossman et al. ........... 248/550 |
| 5,291,967 A | * | 3/1994 | Aoki ........................ 180/312 |
| 5,374,025 A | * | 12/1994 | Whelpley et al. .......... 248/550 |
| 5,544,451 A | | 8/1996 | Cheng et al. |
| 5,630,758 A | | 5/1997 | Rivin |
| 5,738,343 A | * | 4/1998 | Nakajima et al. ........... 267/219 |
| 5,780,740 A | | 7/1998 | Lee et al. |
| 5,780,948 A | | 7/1998 | Lee et al. |
| 5,887,858 A | | 3/1999 | Su |
| 5,899,443 A | | 5/1999 | Su |
| 5,934,653 A | | 8/1999 | Rivin |
| 6,045,090 A | | 4/2000 | Krysinsky et al. |
| 6,059,274 A | * | 5/2000 | Owen et al. ................ 267/136 |
| 6,209,841 B1 | | 4/2001 | Houghton, Jr. et al. |
| 6,378,672 B1 | * | 4/2002 | Wakui ........................ 188/378 |

OTHER PUBLICATIONS

Rivin, Eugene (Evgeny) I., "Vibration Isolation of Precision Equipment," *Precision Engineering*, 1995, vol. 17, pp 41–56.

(List continued on next page.)

*Primary Examiner*—Matthew C. Graham
*Assistant Examiner*—Melody M. Burch
(74) *Attorney, Agent, or Firm*—Howard Kaiser

(57) ABSTRACT

A "passive-active" mount includes an emanator-securement plate, a foundation-securement plate, at least one elastomeric "streamlined resilient element," and at least one collocated motion sensor-vibratory actuator pair. The mount brings to bear, sequentially and complementarily, passive vibration control followed by active vibration as control. The passive vibration control is effectuated by one or more "streamlined resilient elements," each attributed with a "constant natural frequency" (CNF) property whereby such element is naturally predisposed to passively reducing vibration at a particular frequency band regardless of the extent of the loading, within certain limits, to which such element is being subjected. Cumulatively, the streamlined resilient element(s) passively reduce(s) the emanated vibration in CNF fashion before reaching the foundation-securement plate, whereupon the active vibration control is effectuated via one or more electrical feedback loops, each involving a processor/controller and a collocated sensor-actuator pair.

27 Claims, 22 Drawing Sheets

OTHER PUBLICATIONS

Rivin, Eugene (Evgeny) I., "Shaped Elastomeric Components for Vibration Control Devices," *Sound and Vibration*, Jul. 1999, vol. 33, No. 7, pp 18–23.

Schmitt, Regis V. and Kerr, Matthew L., "A New Elastomeric Suspension Spring," Society of Automotive Engineers (SAE), Inc., SAE Paper No. 710058, *Automotive Engineering Congress*, Detroit, Michigan, Jan. 11–15, 1971 (8 pages).

Rivin, E.I., "Principles and Criteria of Vibration Isolation of Machinery," *ASME Journal of Mechanical Design*, Transactions of the ASME, vol. 101, Oct., 1979, pp 682–692.

Rivin, E.I., "Passive engine mounts—Some Directions for Further Development," *SAE 1985 Transactions*, Society of Automotive Engineers (SAE), Inc., SAE Paper No. 850481, Section 3, vol. 94, 1986, pp. 3.582–3.591.

Jen–Houne Hannsen Su et al, "Mechanisms of Localized Vibration Control in Complex Structures," *Journal of Vibration and Acoustics*, Jan. 1996, vol. 118, pp 135–139.

Jen–Houne Hannsen Su, "Robust Pasive–Active Mounts for Machinery and Equipment," *Proceedings of DETC '97*, 1997 ASME Design Engineering Technical Conferences, Sep. 14–17, 1997, Sacramento, California (nine pages).

J.E. Ruzicka, "Fundamental Concepts of Vibration Control," *Sound and Vibration*, Jul. 1971, pp 16–23.

\* cited by examiner

CONSTANT NATURAL FREQUENCY PASSIVE-ACTIVE MOUNT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to methods, apparatuses and systems for isolating vibrations emanating from sources such as machinery, more particularly to those which implement at least one resilient element and which provide support for such sources.

It is environmentally desirable in many contexts to reduce transmission of vibrations to neighboring structure. For example, the U.S. Navy has an interest in attenuating the transmission, via connecting members to supporting structure, of unwanted vibrations from heavy machinery such as ship engines. Devices for reducing such transmission are generally known as vibration "isolators" because they serve to "isolate" the machine's vibration from contiguous structure. A vibration isolator is used to join one object to another and to restrict, to some degree, the transmission of vibration. See, e.g, J. E. Ruzicka, "Fundamental Concepts of Vibration Control," *Sound and Vibration*, July 1971, pp 16–23, incorporated herein by reference. See also, Eugene (Eygeny) I. Rivin, "Principles and Criteria of Vibration Isolation of Machinery," *ASME Journal of Mechanical Design*, Transactions of the ASME, Vol. 101, October 1979, pp 682–692, incorporated herein by reference. Both passive and active vibration isolation systems have been known in the art.

Passive vibration isolators have conventionally involved a passive damping arrangement which provides a resilient element ("spring") along with a damping mechanism ("energy releaser"), and which serves as a support ("mount"), for vibrating machinery or other structure. Passive vibration isolation devices, alternatively referred to as "mounts" or "springs" or "spring mounts" in nomenclature, operate on the principle of low dynamic load transmissibility by a material having a resilient property. Passive mounts are designated "passive" because their function is based upon their inherent property rather than on their ability to, in an "active" manner, react to an in-situ condition.

Passive mounts have been known to use any of various materials for, the resilient element, such as rubber, plastic, metal and air. Elastomeric mounts rely primarily upon the resilience and the damping properties of rubber-like material for isolating vibrations. Mechanical spring mounts implement a helical or other metal spring configuration. Pneumatic, mounts utilize gas and an elastic material (such as reinforced rubber) as resilient elements in a bellows-like pneumatic spring assembly. A pneumatic mount or spring typically comprises a flexible member, which allows for motion, and a sealed pressure container or vessel having one or more compartments, which provides for filling and releasing a gas. Pneumatic springs are conventionally referred to as "air springs" because the gas is usually air. In conventional usage and as used herein the terms "air spring," "air mount" and "air spring mount" are used interchangeably, and in the context of these terms the word "air" means "gas" or "pneumatic," wherein "gas" or "pneumatic" refers to any gaseous substance.

Active vibration isolation has more recently become known in the art. Basically, a sensor measures the structure's vibration, an actuator is coupled with the structure, and a feedback loop tends to reduce the unwanted motion. Typically, an output signal, proportional to a measurable motion (such as acceleration) of the structure, is produced by the sensor. Generally speaking, the actuator includes some type of reaction mass. A processor/controller processes the sensor-generated output signal so as to produce a control signal which drives the reaction mass, the actuator thereby producing a vibratory force, whereby the motion (e.g., acceleration) of the structure is reduced.

The three basic components of an active vibration isolation system are a motion sensor (e.g., a motion transducer), a processor/controller and a vibratory actuator. The sensor responds to vibratory motion by converting the vibratory motion into an electrical output signal that is functionally related to, e.g., proportional to, a parameter (e.g., displacement, velocity or acceleration) of the experienced motion. An accelerometer, for example, is a type of sensor wherein the output is a function of the acceleration input; the output is typically expressed in terms of voltage per unit of acceleration. The most common processor/controller is a "proportional-integral-derivative"-type ("PID"-type) controller, a kind of servomechanism, which proportionally scales, and integrates or differentiates, the sensor response. The actuator is essentially a device adapted to transmitting a vibratory force to a structure; such an actuator has been variously known and manifested as an inertia actuator, inertial actuator, proof mass actuator, shaker, vibration exciter and vibration generator; as used herein, the terms "actuator," "inertia actuator" and "vibratory actuator" are interchangeable and refer to any of these devices. The actuator generates a force, applied to the structure, based on the electrical output signal from the processor/controller.

Incorporated herein by reference are the following two patents: Jen-Houne Hannsen Su U.S. Pat. No. 5,899,443, issued 04 May 1999, entitled "Passive-Active Vibration Isolation"; and, Jen-Houne Hannsen Su U.S. Pat. No. 5,887,858, issued 30 Mar. 1999, entitled "Passive-Active Mount." Also incorporated herein by reference is Jen-Houne Hannsen Su, "Robust Passive-Active Mounts for Machinery and Equipment," *Proceedings of DETC '97*, 1997 ASME Design Engineering Technical Conferences, Sep. 14–17, 1997, Sacramento, Calif. (nine pages).

In Su '443 and Su '858, Su discloses inventions which uniquely and efficaciously combine known passive vibration technology with known active vibration technology. According to either Su '443 or Su '858, one or more vibratory actuators are coupled with (e.g., attached to or mounted upon) the bottom attachment plate of a conventional mount. Su '443 and Su '858 further disclose placement of one or more motion sensors (for sensing, e.g., velocity or acceleration) at the bottom attachment plate so that the sensors and actuators are correlated in pairs, each sensor-actuator pair having one sensor and one actuator in a functionally and situationally propinquant relationship. The inventive mount disclosed in Su '443 and Su '858 is styled therein "passive-active" because, proceeding generally downward from the above-mount object to the below-mount foundation, the object's vibration is first reduced passively and then is further reduced actively.

Su '443 and Su '858 each teach the availing of active control so as to, in effect, increase the dynamic stiffness of the below-mount foundation. The impedance inherent in a realistic below-mount foundation falls short of the impedance inherent in an ideally rigid below-mount foundation. According to Su '443 and Su '858, the impedance differential between foundation reality and foundation ideality is largely compensated for by providing one or more inertia actuators on the bottom plate (e.g., retainer plate, mounting plate, backing plate, or end plate) of the mount, for example inside an air mount on its bottom plate.

Su '443 and Su '858 thus provide more effective, yet practical and affordable, vibration isolation methods, apparatuses and systems. Typically, the electronic components will be commercially available; the sensors, actuators and PID-type controllers appropriate for most inventive embodiments according to Su '443 and Su '858 will be "off-the-shelf" items which can be purchased at less than prohibitive costs. In accordance with Su '443 and Su '858, the sensors and actuators can be retrofitted in existing conventional mounts, or the inventive mount can be manufactured or assembled from scratch.

For many applications according to Su '443 and Su '858, the inventive mount will afford superior performance in isolating vibrations of an above-mount structure from a realistic below-mount foundation; for some applications, however, the inventive mount according to Su '443 and Su '858 can be used quite effectively for isolating vibrations of a below-mount foundation from an above-mount structure such as a piece of equipment. For applications involving heavy machinery, a multiplicity of inventive mounts can be utilized. For a single piece of heavy machinery, vibration isolation effectiveness can be expected to increase in accordance with an increase in the number of inventive mounts that are used.

The active vibration control aspect of the inventions disclosed by Su '443 and Su '858 serves to enhance the passive vibration control aspect of these inventions. The inventions of Su '443 and Su '858 are "fail-safe" in a sense; in the event of inoperability of an inventive mount according to Su '443 and Su '858 (e.g., due to power failure or electromechanical failure), the performance of such inventive mount degrades to that of the conventional passive mount.

The inventions according to Su '443 and Su '858 typically obviate the need to fortify, for isolation purposes, the existing below-mount foundation. The foundation will be less expensive, since its design will involve only considerations concerning load-carrying capacity (e.g., static strength/structural integrity). Vibration-related considerations will not need to be addressed in foundation design; such factors as fatigue life, vibration and noise will be controlled automatically by the advanced mount according to Su '443 and Su '858.

Active control according to both Su '443 and Su '858 typically serves to complement the deficiency of the passive control in the low frequency. Conventional passive mounts are generally characterized by low frequency enhancement; conventional passive mounts typically have inherent low frequency resonance, and consequently may be ineffective or may even cause enhancement of dynamic load transmission at low frequency. In inventive practice according to Su '443 and Su '858, the low frequency disturbance enhancement due to the resonance frequency of the mounts should be more or less reduced, depending on the force output capacity of the actuators used for a given inventive embodiment.

Notwithstanding the significant advantages generally associated with practice of inventive vibration isolation according to Su '443 and Su '858, such practice according to Su '443 and Su '858 may be less than entirely satisfactory for certain applications. In particular, typical inventive embodiments according to Su '443 and Su '858 are suitable for a rather limited scope of isolation loading; that is, in effecting vibration isolation, a typical apparatus according to Su '443 or Su '858 is designed to be subjected to a relatively narrow range of weight, albeit the apparatus is highly effective for such purposes. Nevertheless, it is sometimes desirable to utilize vibration isolation apparatus which is applicable to a relatively broader scope of isolation loading—that is, to a relatively wide range of weight to which the apparatus is to be subjected in effecting vibration isolation.

SUMMARY OF THE INVENTION

In view of the foregoing, it is an object of the present invention to provide method, apparatus and system for highly effective vibration isolation.

It is another object of this invention to provide method, apparatus and system for accomplishing same in association with a wide range of loads.

A further object of this invention is to provide such method, apparatus and system which are practical, relatively uncomplicated and cost-effective for many applications.

The present invention provides apparatus, system and method for vibration isolation, especially for reducing transmission of vibration of an object to a foundation for said object. Certain principles pertaining to the present invention's passive-active elastomeric/viscoelastic isolator (mount) are the same as or similar to those pertaining to the passive-active air mount disclosed by Su '443 and Su '858. Notably and contradistinctively, however, the passive-active mount according to this invention is a "constant natural frequency" (abbreviated herein, "CNF") passive-active mount. The CNF passive-active mount according to this invention affords wide load range application and simple implementation. The present invention's passive vibration control is effectuated by one or more "streamlined resilient elements," each attributed with a "constant natural frequency" (CNF) quality whereby such element is naturally predisposed to passively reducing vibration at a particular frequency band regardless of the extent of the loading, within certain parameters, to which such element is being subjected. The CNF-endowed passive vibration control represents a significant improvement vis-a-vis' Su '443 and Su '858.

Regis V. Schmitt and Matthew L. Kerr, "A New Elastomeric Suspension Spring," Society of Automotive Engineers (SAE), Inc., SAE Paper No. 710058, *Automotive Engineering Congress*, Detroit, Mich., Jan. 11–15, 1971 (8 pages), incorporated herein by reference, disclose a constant natural frequency spherical elastomeric spring element. Schmitt et al. teach (Schmitt et al., first page) the advantageousness of "maintaining a constant natural frequency, on the primary suspension spring, with varying vehicle weight." A constant natural frequency is seen by Schmitt et al. as capable of "providing consistent ride quality with varying vehicle weight." As explained by Schmitt et al., "Natural frequency is a function of spring rate and supported mass. Thus, it changes as supported mass changes if spring rate is a constant (linear spring). The contribution of a linear, or nearly linear, primary suspension spring to natural frequency changes with vehicle weight. This results in a compromise which gives best performance over only a part of the total range of truck weight expected."

Schmitt et al. (Schmitt et al., third page) tested a spherical elastomeric sample and found that it "does, in fact, have a constant frequency characteristic." They further found "that, in the spherical spring, natural frequency is dependent on the size of the sphere and not on compound stiffness. Increasing compound stiffness (durometer) decreases the actual sphere deflection for a given load. The spring rate, hence natural frequency, for that load depends on the slope of the load deflection. curve at the point reached by that load. The shape of the load deflection curve and its slope for a given load is dependent on the size of the sphere and not on compound stiffness." In addition to a spherically shaped elastomeric sample, they tested elastomeric samples having "hourglass" and "truncated" shapes.

Eugene (Evgeny) I. Rivin, "Passive Engine Mounts—Some Directions for Further Development," *SAE 1985 Transactions*, Society of Automotive Engineers (SAE), Inc., SAE Paper No. 850481, Section 3, Vol. 94, 1986, pp. 3.582–3.591, incorporated herein by reference, discloses that "[a] constant natural frequency (CNF) mount is characterized by a specific. nonlinear load-deflection characteristic when its vertical stiffness $k_z$ is proportional to the applied weight load W, $k_z$=AW. Accordingly, vertical (bounce) natural frequency $f_z$ is [constant]. To be a truly CNF mount, its spring rates in the x and y directions must also be proportional to W, or ratios $k_z/k_x$ and $k_z/k_y$ must be constant while the weight load varies in its rated range"

Rivin (1985) teaches that CNF "mounts have several advantages, whose relative importance depends on the goals to be achieved. If decoupling is considered as an important goal, it can be much more reliably achieved by using CNF mounts . . . . Another unique advantage of the CNF mount is its insensitivity to rubber durometer variations . . . . If the rubber durometer deviates into lower values, . . . the natural frequency for a given weight load in the linear range becomes smaller. However, the natural frequency in the CNF range stays the same, although the range starts from a smaller weight load . . . . A similar effect occurs for a higher-than-nominal durometer . . . . In this case the natural frequency for a given weight load in the linear range becomes higher . . . , but the natural frequency in the CNF range is still the same.""Eugene (Evgeny) I. Rivin, "Vibration Isolation of Precision Equipment," *Precision Engineering*, 1995, vol. 17, pp 41–56, incorporated herein by reference, discloses (e.g., Rivin, 1995, p 55) the "use of constant-natural-frequency (CNF) isolators, in which stiffness in both vertical and horizontal directions is proportional to the weight load on the isolator. As a result, such isolators provide a high degree of dynamic decoupling without the need to determine the center-of-gravity position, to calculate weight load distribution between the mounting points, etc. In addition to this, such isolators have a significantly reduced sensitivity to manufacturing tolerances."

Eugene (Evgeny) I. Rivin, "Shaped Elastomeric Components for Vibration Control Devices," *Sound and Vibration*, July 1999, Vol. 33, no. 7, pp 18–23, incorporated herein by reference, teaches (Rivin, 1999, p 21) that "[p]erformance of vibration isolators improves significantly if the isolator has a special nonlinear load-deflection characteristic whereas its stiffness is proportional to weight load on the isolator within a relatively broad load range (constant natural frequency or CNF characteristic)." Rivin discloses spheres, radially loaded cylinders and radially loaded toruses as examples of "shaped elastomeric components." It is taught by Rivin that the "use of shaped elastomeric components results in much more compact designs due to larger allowable compression deformations, under static loads. Larger compression deformations can be allowed due to a much more uniform stress distribution and lower maximum stresses/strains and lower creep rates as compared with conventional bonded rubber blocks made of the same rubber blend. In addition to these important advantages, it has been shown that the CNF isolators have a substantially lower sensitivity to production variations of rubber hardness than conventional isolators with linear load-deflection characteristics, resulting in much better performance uniformity. Thus, use of radially loaded rubber cylinders/toruses could significantly advance the state of the art for vibration isolators. Spherical rubber elements have the same, advantages (constant natural frequency in a relatively broad load range and reduced creep) and can be used for lightly loaded vibration isolators."

Evgeny I. Rivin U.S. Pat. No. 5,934,653, entitled "Non-linear Flexible Connectors with Streamlined Resilient Elements" and issued 10 Aug. 1999, is hereby incorporated herein by reference. Rivin '653 discloses a streamlined elastomeric (e.g., rubber) resilient element characterized by nonlinear load deflection. Disclosed by Rivin '653 (e.g., Rivin '653, col. 2) is "the use of streamlined rubber elements such as balls, ellipsoids, toruses, radially-loaded cylinders, etc." According to Rivin '653, such streamlined resilient elements are characterized by significant (e.g., two to three times) increase in the allowable continuous compression deformation, and are further characterized by a progressively nonlinear deformation. Rivin '653teaches the desirability of "utilizing streamlined resilient elements without compromising their special deformation properties, which may be caused by their bonding to other elements."

The following U.S. patents, each of which is incorporated herein by reference, are also of note: Houghton, Jr. et al. U.S. Pat. No. 6,209,841 B1 issued 03 Apr. 2001; Krysinsky et al. U.S. Pat. No. 6,045,090 issued 04 Apr. 2000; Lee et al. U.S. Pat. No. 5,780,948 issued 14 Jul. 1998; Lee et al. U.S. Pat. No. 5,780,740 issued 14 Jul. 1998; Rivin U.S. Pat. No. 5,630,758 issued 20 May 1997; Cheng et al. U.S. Pat. No. 5,544,451 issued 13 Aug. 1996; Leyshon U.S. Pat. No. 5,016,862 issued 21 May 1991; Hall et al. U.S. Pat. No. 4,880,201 issued 14 Nov. 1989; Lafferty U.S. Pat. No. 4,619,467 issued 28 Oct. 1986; Shtarkman U.S. Pat. No. 4,509,730 issued 09 Apr. 1985; Stone et al. U.S. Pat. No. 4,452,329 issued 05 Jun. 1984; Barley U.S. Pat. No. 4,384,701 issued 24 May 1983; Madden U.S. Pat. No. 4,218,187 issued 19 Aug. 1980; Leingang U.S. Pat. No. 3,997,151 issued 14 Dec. 1976; Taylor U.S. Pat. No. 3,947,004 issued 30 Mar. 1976.

The present invention uniquely features the utilization of one or more shaped elastomeric (e.g., viscoelastic) elements (e.g., members) in order to increase the load range applicability of the "passive" aspect of a passive-active mount such as disclosed by Su '443 and Su '858. These shaped or contoured elastomeric (e.g., viscoelastic) elements are referred to herein as "streamlined resilient elements." Typically, a CNF passive-active mount according to this invention will be uniquely characterized by a specific arrangement of one or more streamlined resilient elements along with one or more inertial actuators. The present invention's CNF passive-active mount affords wide load range application and simple implementation.

Since the streamlined resilient element or elements maintain approximately the same mount resonance frequency for a wide range of isolation weight, the mount according to this invention is termed a "constant natural frequency passive-active mount" (or, abbreviatedly, a "CNF passive-active mount"). At least one streamlined resilient element tends to impart a constant natural frequency (CNF) attribute to the inventive passive-active mount. Accordingly, the term "streamlined resilient element," as used herein, refers to any elastomeric (e.g., viscoelastic) object which has this kind of CNF-attributive quality when used in the context of vibration isolation. Because of its CNF-attributive quality, a streamlined resilient element" is also variously and synonymously referred to herein as a "constant natural frequency element," or a "CNF element," or "a streamlined CNF element," or a "resilient CNF element," or a "streamlined resilient CNF element."

Generally, a "streamlined resilient element" will be characterized by a so-called "streamlined" shape, such as but not limited to that which describes one or more of the following: a spherical shape; a prolate spheroid (e.g., ellipsoid) shape adaptable to loading in either the short-axial or long-axial direction; a cross-sectionally circular segmented toroidal (doughnut) shape (e.g., a section of a cross-sectionally circular torus) adaptable to radial loading; a cross-sectionally noncircular (oval, e.g., elliptical) segmented toroidal (doughnut) shape (e.g., a section of a cross-sectionally oval torus) adaptable to radial loading; a cross-sectionally circular cylindrical shape adaptable to radial loading; a cross-sectionally noncircular (oval, e.g., elliptical) cylindrical shape adaptable to radial loading a cross-sectionally circular disk shape (which, actually, is an axially-longitudinally short form of a cylindrical shape) adaptable to radial loading; a cross-sectionally noncircular (oval, e.g., elliptical) disk shape (which, actually, is an axially-longitudinally short form of a cylindrical shape) adaptable to radial loading, a cross-sectionally circular toroidal (doughnut) shape adaptable to radial loading; a cross-sectionally noncircular (oval, e.g., elliptical) toroidal (doughnut) shape adaptable to radial loading; a toroidal shape, adaptable to radial loading, having a longitudinal (circumferential) axis of symmetry which defines a circular shape; a toroidal shape, adaptable to radial loading, having a longitudinal (circumferential) axis of symmetry which defines a noncircular (oval, e.g., elliptical) shape; a segmented toroidal shape, adaptable to radial loading, having a longitudinal axis of symmetry which defines a segment of a circular shape; a segmented toroidal shape, adaptable to radial loading, having a longitudinal axis of symmetry which defines a segment of a noncircular (oval, e.g., elliptical) shape; any truncated (e.g., flattened) version of any of the aforementioned shapes.

Generally, a streamlined resilient element will be at least substantially characterized by a curvilinear profile (such profile lying in an imaginary plane through the end plates and perpendicular thereto) which describes either a circular shape or a non circular shape such as an oval. According to frequent inventive practice, the streamlined resilient element is truncated at one or both ends, perhaps for the purpose of facilitating coupling of the streamlined resilient element with the end plates, and perhaps alternatively or additionally for the purpose of enhancing vibration isolation characteristics of the inventive mount. A streamlined resilient element which is truncated at either or both ends approximately or substantially defines the shape which would exist in the absence of such truncation.

According to typical embodiments of the present invention, there are two securement members connected, on opposite sides or ends, with the streamlined resilient element. The inventive CNF passive-active mount represents the "isolator" entity. The mount includes two securement members, viz., an "isolatee-entity-securement" member and an "isolated-entity-securement" member. The mount's "isolatee-entity-securement" member is the mount's securement member which is attached to, or is attached with respect to, the "isolatee" entity. The "isolatee" entity is the, entity from which the "isolated" entity's vibrations are sought to be isolated. Another securement member of the mount, viz., the "isolated-entity-securement" member, is attached to, or is attached with respect to, the isolated entity. For most inventive embodiments, the isolated entity is an object (such as a machine) and the isolatee entity is a "foundation" for the object. An important benefit of the present invention is its applicability to a wide range of masses (or weights) of the isolated entity.

Typically in accordance with this invention, each actuator has a companion sensor. Each sensor responds to a local vibratory motion of the mount's isolatee-entity-securement member by sending a sensor feedback signal to a signal processor, which in turn sends a command signal to the sensor's companion actuator, which in turn exerts or imparts a vibratory control force or motion upon the mount's isolatee-entity-securement member. Each sensor continuously responds to the local vibration of the isolatee-entity-securement member, and the feedback loop inclusive of that sensor thus perpetuates. Each independent active vibration control subsystem includes a sensor and its corresponding actuator. The cumulative active vibration control system includes all of the individual active vibration control subsystems, each of which is uncomplicated.

When used herein adjectively to modify an inventive mount's securement member, the words "upper," "top," "lower" and "bottom" are terms of convenience which are intended to suggest structural and functional contradistinction rather than relative spatial positioning. Hence, in such contexts, the terms "upper" and "top" refer to isolatee entity securement, i.e., securement of the mount with respect to the isolated entity, e.g., a vibrating object; the terms "lower" and "bottom" refer to isolated entity securement, i.e., securement of the mount with respect to the isolatee entity, e.g., a foundation for the vibrating object.

Typical inventive embodiments, in application, effectuate a "localized" vibration control approach rather than a "global" vibration control approach. Incorporated herein by reference is Su, Jen-Houne Hannsen Su et al., "Mechanisms of Localized Vibration Control in Complex Structures," *Journal of Vibration and Acoustics*, January 1996, Volume 118, pages 135–139. This paper is instructive regarding localized vibration control, which involves stabilization in localized areas of a structure, as distinguished from global vibration control, which involves stabilization of the entire structure.

Most active vibration control research, particularly in space structures applications, has dealt with controlling vibration in a global sense; the controller stabilizes the entire structure. When the interest lies in stabilizing only certain localized areas of the structure, the control objective can be focused and actuators/sensors are generally required only in the "control areas." This localized control approach can provide more effective vibration suppression in the control areas, and can require fewer actuators and sensors compared to global vibration control. Deciding where to mount sensors and actuators is somewhat simpler in a localized vibration control problem than in a general vibration control problem. For localized vibration control, sensors and actuators are usually located within the control areas, which usually represent together a relatively small portion of the entire structure.

A typical inventive vibration isolator according to this invention is adapted for engagement with a processor/controller (e.g., PID-type controller) which is capable of generating a control signal. The vibration isolator comprises a spring assembly, at least one sensor and at least one actuator. The spring assembly includes a top member (for securing the spring assembly with respect to an isolated entity), a bottom member and at least one interposed streamlined resilient element. The top member (typically a plate-type structure) is for securing the spring assembly with respect to an isolated entity. The bottom member (typically a plate-type structure) is for securing the spring assembly with respect to an isolatee entity (e.g., the foundation). Each streamlined resilient element is characterized by an approximately constant natural frequency (CNF) regardless of the loading imposed within a particular range of loading (e.g., weight).

Each streamlined resilient element is at least substantially composed of an elastomeric material and at least substantially has a contoured shape having CNF properties, such as spheroidal, prolate spheroidal, circular cylindrical, noncircular cylindrical, torroidal and torroidal segment. A disk is a kind of cylinder; the term "disk," as used herein, is a descriptive term for a cylinder characterized by a short axial length relative to its diameter. Each streamlined resilient element has the property of passively reducing vibration within a "special passive-reduction-related frequency bandwidth" which is at least substantially constant when the streamlined resilient element is subjected to a wide range in terms of the degree of loading. Cumulatively speaking, the one or more streamlined resilient elements are thereby capable, in net effect, of passively reducing vibration within a "general passive-reduction-related frequency bandwidth" which is at least substantially constant when the one or more streamlined resilient elements are subjected to a wide range in terms of the degree of loading which is associated with the isolated entity and/or the isolatee entity. According to typical inventive embodiments, the "general passive-reduction-related bandwidth" is approximately commensurate with the "special passive-reduction-related bandwidth."

It is believed by the inventors that a streamlined resilient element has constant natural frequency attributes essentially because of the "streamlined" shape and the material resiliency (or elasticity) of the streamlined resilient element. In inventive operation, as higher load is applied with respect to the streamlined resilient element (i.e., the passive component), more material of the streamlined resilient element will come in contact with the attachment plates. Increased contact will render the streamlined resilient element stiffer, thereby maintaining the ratio of stiffness (spring rate) to load.

The one or more sensors, the one or more actuators and the processor-controller with which the inventive isolator is engaged represent components of a feedback loop system. Each sensor is coupled with the bottom member and is capable of generating a sensor signal which is in accordance with the vibration in a local zone of interest in the bottom member. Each actuator is coupled with the bottom member and is collocationally paired with one sensor so as to share approximate coincidence with respect to both physical situation and operational direction. Each actuator is capable of generating, in the local zone of interest of the sensor with which the actuator is collocationally paired, a vibratory force which is in accordance with the control signal which is generated by the processor/controller. The control signal is in accordance with the sensor signal which is generated by the sensor with which the actuator is collocationally paired. The vibratory force which is generated by an actuator has the tendency of actively reducing vibration within an "active-reduction-related frequency bandwidth" which differs from the "general passive-reduction-related bandwidth."

Many embodiments of this invention implement a single sensor/actuator unit and a plurality of streamlined resilient members; typically, according to such embodiments, the collocated sensor/actuator unit is centrally located on the bottom plate, while the streamlined resilient members are peripherally located on the bottom plate. For such embodiments, the inventive feedback loop system will usually include a single feedback loop system. Other inventive embodiments implement a plurality of sensor/actuator units and at least one streamlined resilient member; typically, according to such embodiments, each streamlined resilient member will be centrally located on the bottom plate, while each of the plural sensor/actuator units will be peripherally located thereon, typically in symmetrical fashion about the center thereof. For such embodiments, the inventive feedback loop system will include a plurality of feedback loop subsystems. Generally, in inventive practice, the desired numbers, sizes, shapes and arrangements of the at least one streamlined resilient member and the at least one sensor/actuator unit will at least to some extent depend on the overall size and shape of the inventive constant natural frequency (CNF) mount and the force output capacity of the actuators selected.

An inventive configuration involving a single, centrally located sensor/actuator unit and plural, peripherally located streamlined resilient members may be preferable for many applications, due at least to greater compactness vis-a-vis' other inventive configurations. For instance, an inventive configuration involving more than one centrally located sensor/actuator unit will generally take up more space than will an inventive configuration involving one centrally located sensor/actuator unit. Similarly, with regard to inventive embodiments wherein at least one streamlined resilient member is centrally located and at least two sensor/actuator units are peripherally located, an inventive configuration involving more than one centrally located streamlined resilient member will generally take up more space than will an inventive configuration involving one centrally located streamlined resilient member.

Regardless of whether one or more sensor/actuator units is inventively employed, each sensor is coupled with the bottom plate and generates a sensor output signal which is a function of the localized vibration of the bottom plate. The PID-type controller generates at least one control signal, each control signal being a function of its collocated sensor signal. Each actuator is coupled with the bottom plate above the bottom plate, wherein the sensors and actuators are in one-to-one correspondence; that is, each actuator is located proximate the corresponding sensor and generates a vibratory force which is a function of the control signal which is a function of the sensor signal generated by the corresponding sensor. Each feedback loop system or subsystem will include a sensor and an actuator, correlatively paired For many inventive embodiments it is preferred that each sensor-actuator unit (sensor-to-actuator correlation) include "collocation" of the sensor and the corresponding actuator; i.e., each collocated sensor-actuator pair is positioned in a kind of spatial and vectorial alignment, whereby the sensing of the sensor and the actuation of its corresponding actuator are approximately in the same direction. For some such inventive embodiments having at least two sensors and at least two actuators, all the collocational directions preferably are approximately parallel.

Some inventive embodiments manifesting collocational parallelism preferably manifest a kind of symmetry which may serve to optimize, perhaps even synergistically, the overall effectiveness of the individual localized active vibration control system or subsystems. For typical such embodiments, the centrally located entity or entities (whether this be at least one streamlined flexible member or at least one sensor/actuator unit) are characterized by a centric imaginary axis which is approximately vertical (i.e., approximately perpendicular to the bottom plate). This centric imaginary axis is approximately coincident with or approximately parallel to the approximately vertical (i.e., approximately perpendicular to the bottom plate) collocational direction of each sensor/actuator unit, as well as to the approximately vertical (i.e., approximately perpendicular to the bottom plate) imaginary axis of at least substantial symmetry of each streamlined flexible member. Every arrangement of the at least one sensor/actuator unit, in terms of their respective collocational directions, is characterized by approximate symmetry with respect to the centric axis. Similarly, every arrangement of the at least one streamlined flexible member, in terms of their respective axes of symmetry, is characterized by approximate symmetry with respect to the centric axis. Further, the top and bottom plates are typically congruous with each other so that their respective perimeters are also characterized by approximate symmetry with respect to the centric axis.

Typically, both the top (upper) and bottom (lower) members used for securing a conventional air mount are flat structures, e.g., plates. For illustrative purposes, the top and bottom plates are exemplified herein as each having a rectangular (in particular, a square) shape; nevertheless, in the light of this disclosure, it will be understood by the ordinarily skilled artisan that, in inventive practice, the top and bottom plates can each describe practically any shape, and that such shapes can differ from each other (e.g, they need not be comparable or similar). Generally in practicing the present invention, the lower plate's upper surface will be available for inventive sensor-actuator implementation in combination with streamlined flexible member implementation.

The present invention features the utilization of one or more streamlined resilient elements. Any number, shape or combination of shapes of discrete (e.g., segmented) streamlined resilient elements is possible in accordance with the present invention. The CNF passive-active mount in accordance with the present invention can be used for a wide range of vibration isolation weight. The inventive mount is typically feasible for load ranges between as high as ten times to one hundred times the minimum load. In other words, generally speaking, the present invention's CNF passive-active mount can operate in inventively appropriate CNF fashion in a load range which is extends between the minimum load and some large multiple thereof. According to some inventive embodiments, the load range is between the minimum load and ten times the minimum load. According to other inventive embodiments, the load range is between the minimum load and one hundred times the minimum load. According to most inventive embodiments, the load range will be between the a minimum load value and a multiple load value of the minimum load value, wherein the multiple load value is between ten times and one hundred times the minimum load value. That is to say, the wide (broad) range of loading, in terms of the degree of loading which at least substantially results from at least one of said isolated entity and said isolatee entity, is an approximate range which is between a minimum loading value and a maximum loading value; the maximum loading value is between about ten times and about one hundred times the minimum loading value.

Yet, the inventive mount typically is substantially smaller than the conventional mount designs which would seek to accomplish vibration isolation over broad loading ranges. Since each inventive CNF passive-active mount achieves vibration isolation over a broad loading range, a smaller inventory of inventive mounts will suffice for many purposes. Moreover, the typical inventive mount is characterized by lower heat, generation than characterized conventional mounts. Many inventive embodiments are configured so as to provide good heat ventilation for the active component (e.g., the component which includes at least one collocated actuator/sensor pair). The same or similar inventive CNF passive-active mount design can be used at different locations or on different types of foundations. The present invention has a simple non-pneumatic design which advantageously admits of easy fabrication. Furthermore, the typical inventive mount has snubbing/captive capability for shock control.

Other objects, advantages and features of this invention will become apparent from the following detailed description of the inventions when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
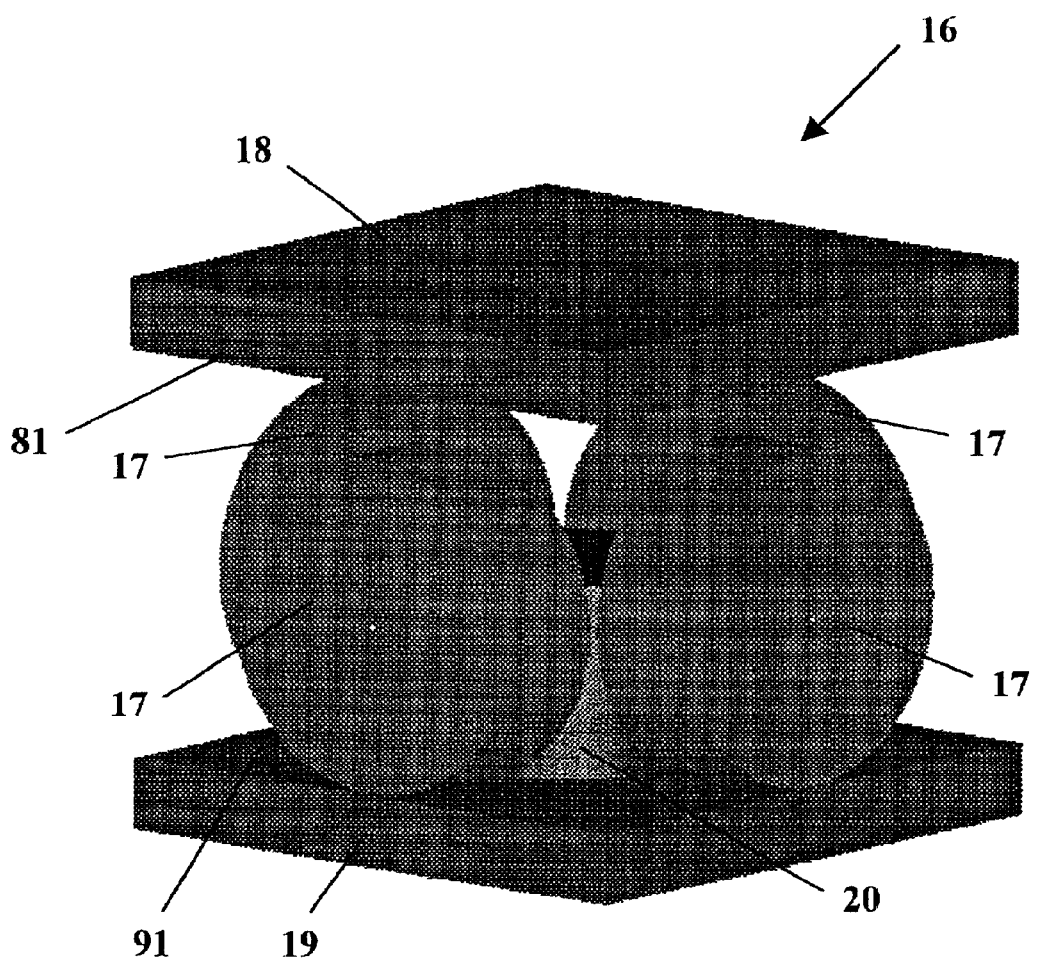
FIG. 1 is a diagrammatic perspective view of an embodiment of a CNF passive-active mount in accordance with the present invention, wherein one sensor/actuator unit is centrally situated and four approximately circular disk-shaped streamlined resilient elements are peripherally situated. For illustrative purposes, the upper plate is shown to be slightly separated (raised) from the streamlined resilient elements.
Figure 2:
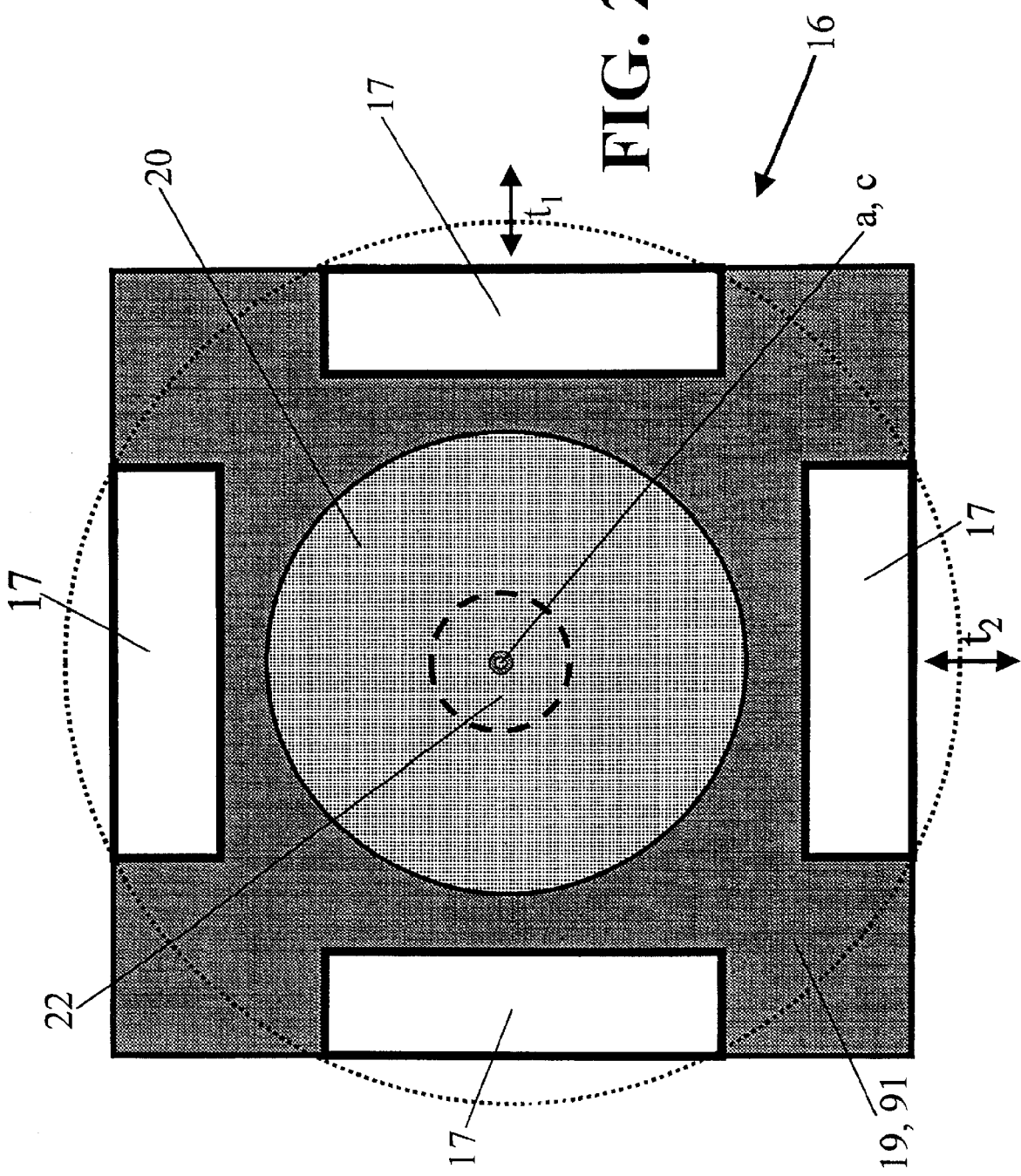
FIG. 2 is a diagrammatic top plan view, sans upper plate and partially in section, of the inventive embodiment shown in FIG. 1.
Figure 3:
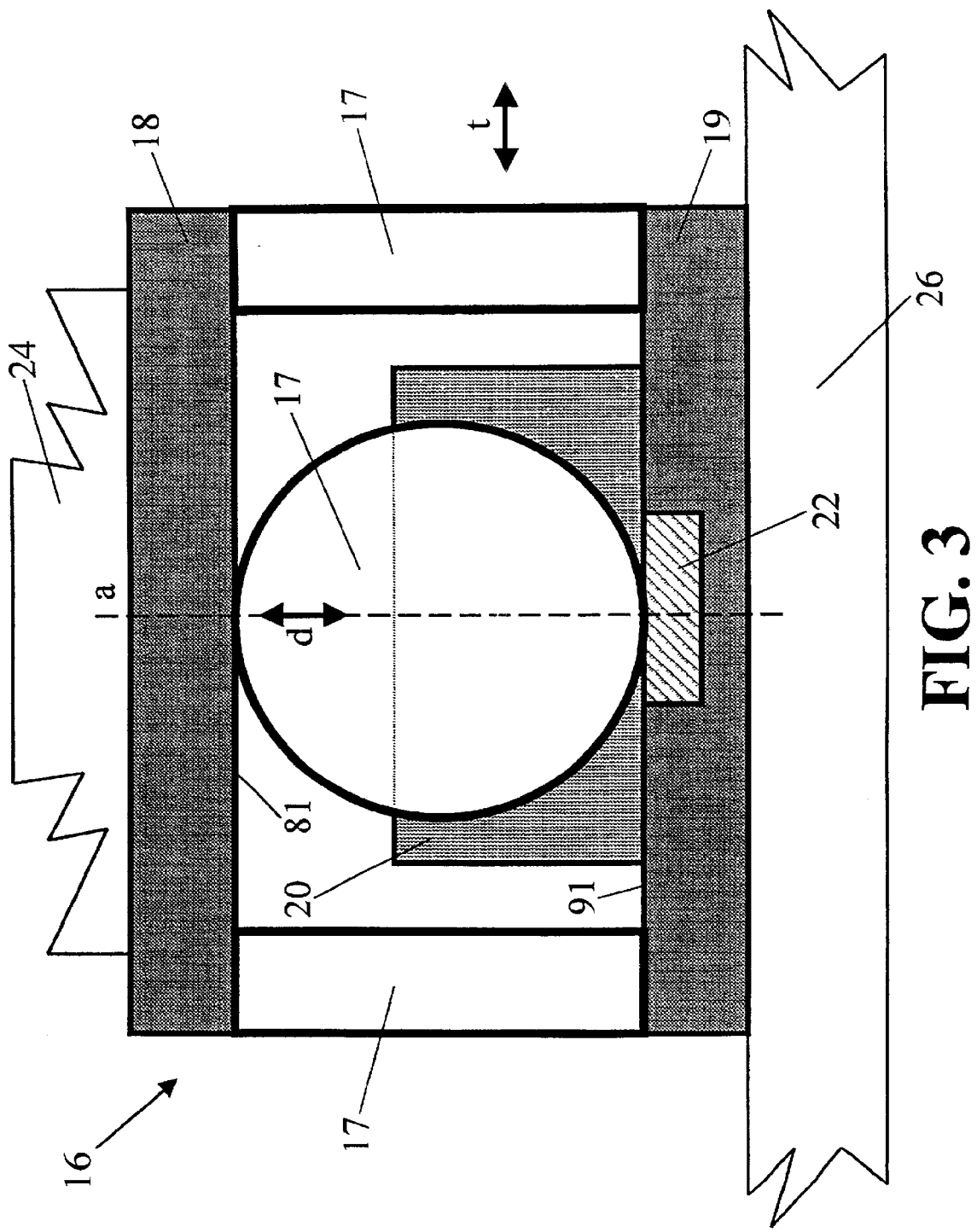
FIG. 3 is a diagrammatic elevation view, partially in section, of the inventive embodiment shown in FIG. 1.

Referring now to FIG. 1 through FIG. 3, constant natural frequency (CNF) passive-active mount 16 includes four peripherally situated cylindrical streamlined resilient CNF elements 17, square upper plate-like member 18, square lower plate-like member 19, an inertia actuator (or "shaker") 20, and a velocity sensor 22. Actuator 20 and sensor 22 represent a collocated actuator-sensor pair; that is, actuator 20 and sensor 22 are coupled with plate 19 and are centrally located, collocatedly at center c. Streamlined resilient elements 17 are distributed about center c, perimetrically or peripherally in relation to each of plate members 18 and 19.

Resilient elements 17 are shaped like short cylinders (disks), and are situated so that their circumferential surfaces are contacting, on opposite sides, the two plates 18 and 19.

More specifically, as regards each streamlined resilient element 17, upper plate 18 has a lower surface 81 which contacts a surface portion of resilient element 17, and lower plate 19 has an upper surface 91 which contacts a surface portion of resilient element 17.

The CNF elements 17 have a "streamlined" shape characterizing "constant natural frequency" elements, are attributed with flexibility or resiliency, and are made of an elastomeric or viscoelastic material. Inertia actuators 20 are mounted upon upper surface 91 of lower plate 19. Velocity sensors 22 are mounted in blind tapped holes in lower plate 19 at virtually the same locations. Actuators 20 and sensors 22 are thus paired one-to-one, i.e., one actuator 20 correspondingly with respect to one sensor 22. Inventive CNF mount 16 is installed between machinery 24 and foundation 26.

Plates 18 and 19 can be made of metal and non-metallic materials (e.g. composites) provided with blind tapped holes (conventionally abbreviatedly referred to as "blind taps") and/or protruding bolts, not shown, which serve to facilitate attachment to other structures. Blind tap holes are attachment provisions, recessed in plates 18 and 19, which are closed at the bottom until a bolt or stud is inserted for attachment purposes. The peripheral (perimetric) shapes of plates 18 and 19 can vary, depending on the application. For instance, plate 19 is shown in FIG. 2 to be either rectangular or circular. Practically any peripheral plate shape, rectilinear and/or curvilinear (e.g., rectangle, circle, oval, polygon having any number of sides, etc.) is possible in inventive practice, but usually with the requisite that plates 18 and 19 each at least generally, at least approximately or at substantially define a plane.

According to some inventive embodiments, plates 18 and 19 are the original end closures or retainers themselves which are attached to resilient members 17; according to other inventive embodiments, plates 18 and 19 are made to incorporate auxiliary plate-shaped members, coupled with the original retainer members, because the original retainer members are too small (e.g., diametrically) to effectuate a particular application. Although the term "mounting plates" has conventionally been used to denote such auxiliary plates used for mounting purposes, the term "plate" as used herein refers to any mount 16 end (or backing) plate which can be used for mounting purposes, including either an original retainer member or an auxiliary mounting member or some combination thereof.

Figure 4:
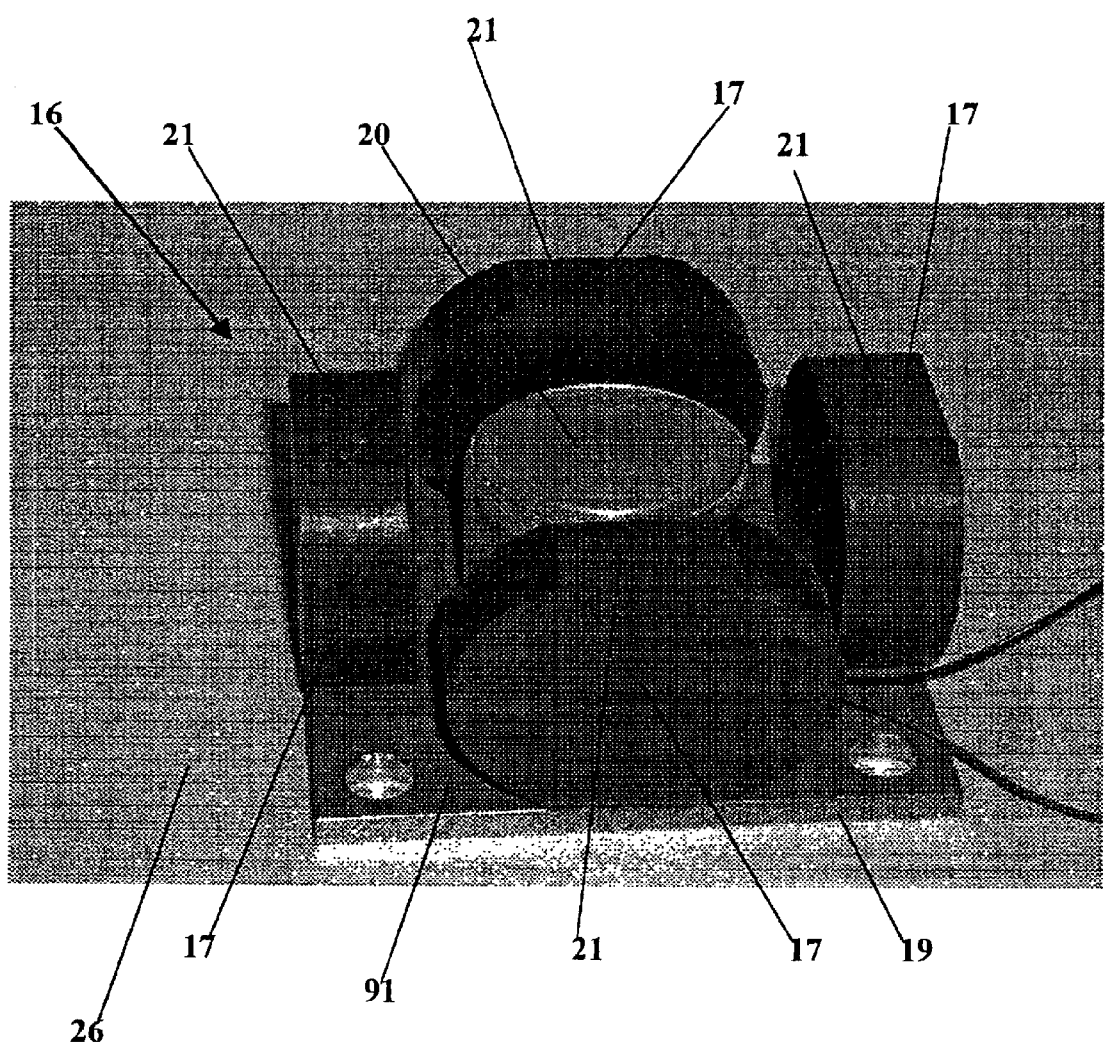
FIG. 4 is a photographic perspective view of a prototypical embodiment of an inventive CNF passive-active mount, such prototypical embodiment being similar to the embodiment shown in FIG. 1, wherein the streamlined resilient elements are oblong and are characterized by oppositely sided flattened edges (truncations) for facilitating attachment to the upper and lower plates. The upper plate is removed from this view for illustrative purposes.
Figure 5:
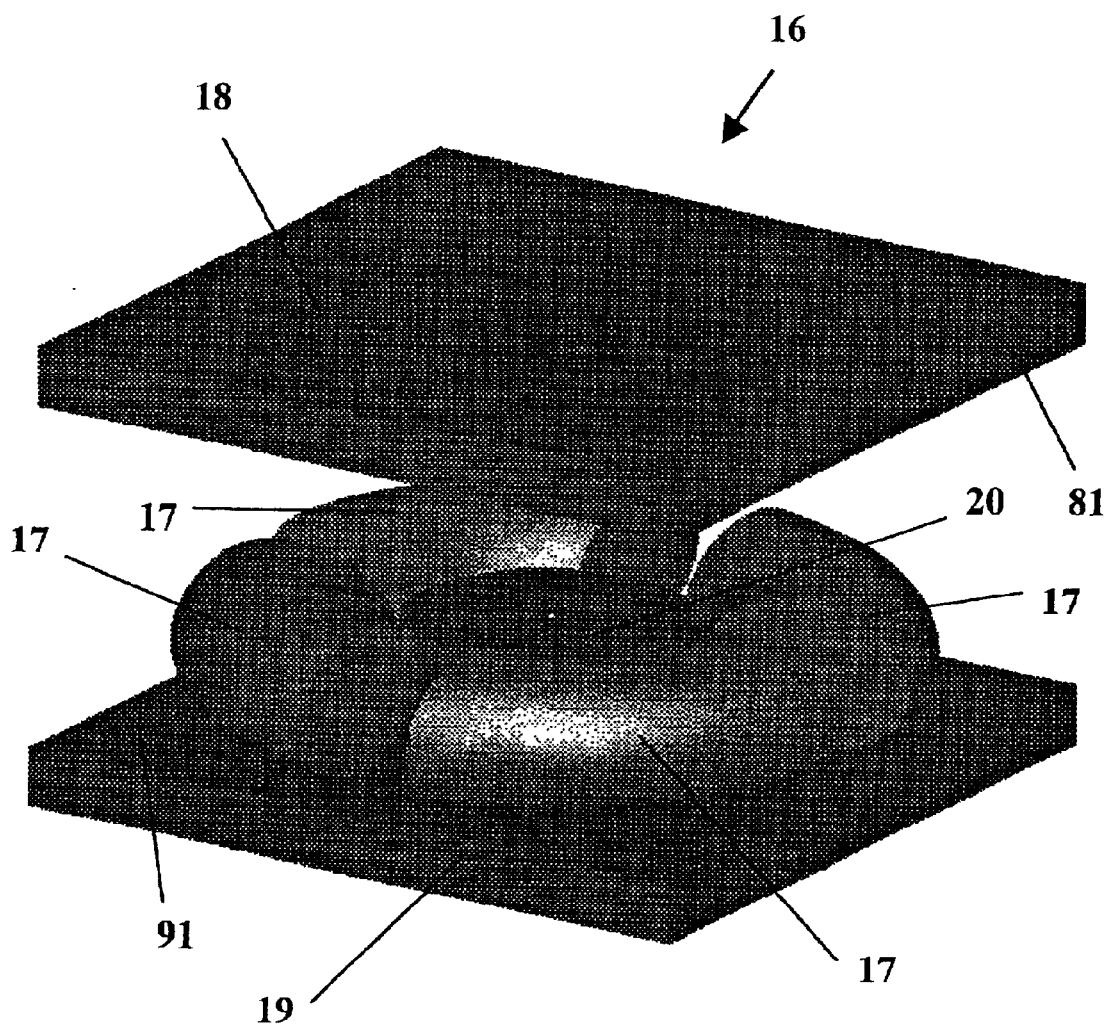
FIG. 5 is a diagrammatic perspective view of another embodiment of a CNF passive-active mount in accordance with the present invention, wherein one sensor/actuator unit is centrally situated and four streamlined resilient elements, approximately shaped like one-quarter segments of a torus (i.e., a "doughnut," or an annular, tubular ring), are peripherally situated. For illustrative purposes, the upper plate is shown to be slightly separated from the streamlined resilient elements.

Reference is now made to FIG. 4 and FIG. 5, which each show a mount 16 arrangement similar to that shown in FIG. 1 through FIG. 3. Notable are the distinguishable shapes of resilient elements 17 shown in FIG. 1 through FIG. 3, vis-a-vis' those shown in FIG. 4, vis-a-vis' those shown in FIG. 5. The resilient elements 17 shown in FIG. 1 through FIG. 3 describe circular cylindrical (more specifically, disk) shapes. The resilient elements 17 shown in FIG. 4 are somewhat prolate, in comparison with the circular disk shapes shown in FIG. 1, so as to describe oval or oblong cylindrical (more specifically, disk) shapes. The resilient elements 17 shown in FIG. 5 are shaped like "donut segments."

Figure 6:
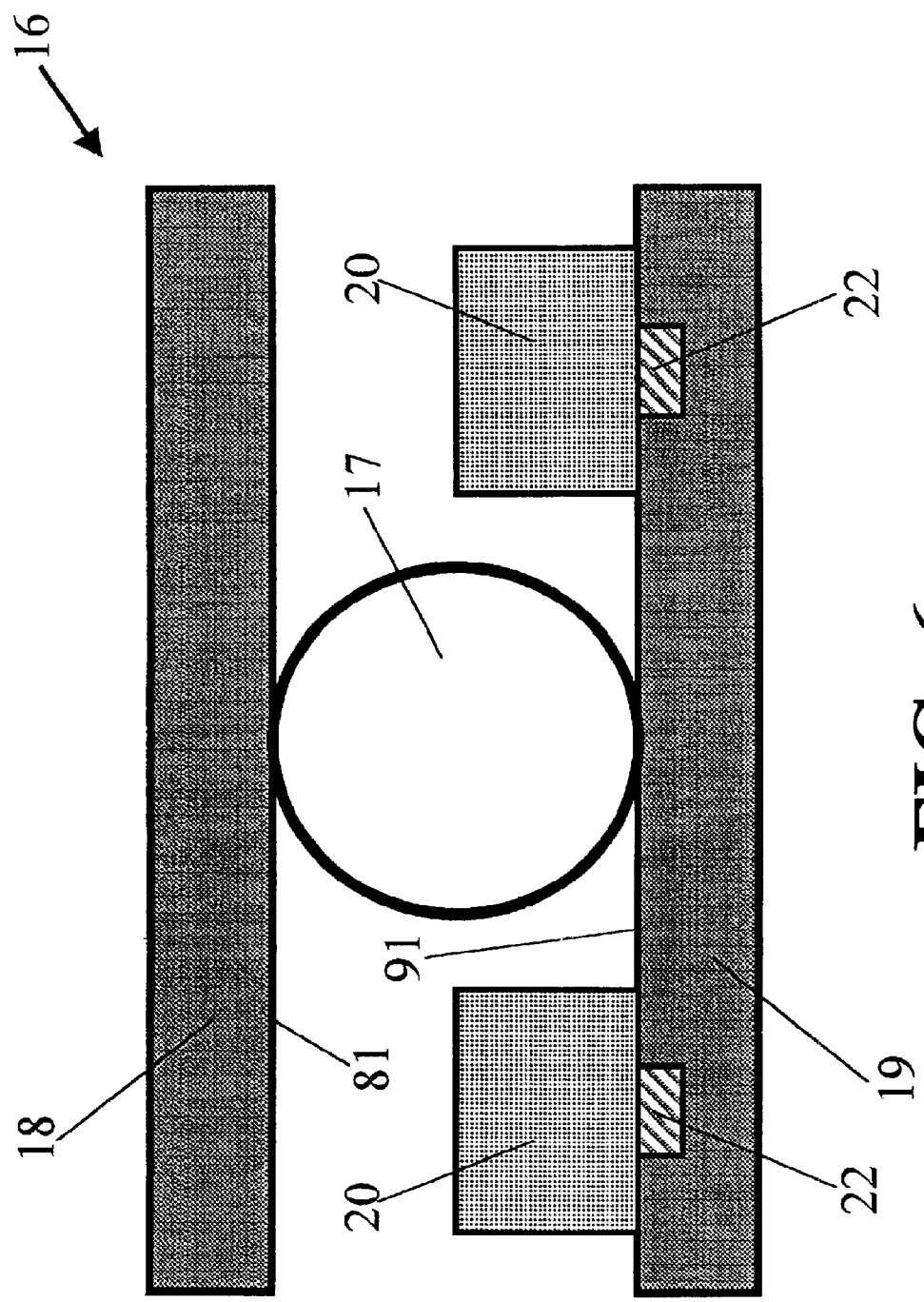
FIG. 6 is a diagrammatic elevation view, partially in section, of another embodiment of a CNF passive-active mount in accordance with the present invention, wherein one approximately spherical (with diameter comparable to the length/width of the attachment plates) streamlined resilient element is centrally situated and (at least) two sensor/actuator units are peripherally situated.
Figure 7:
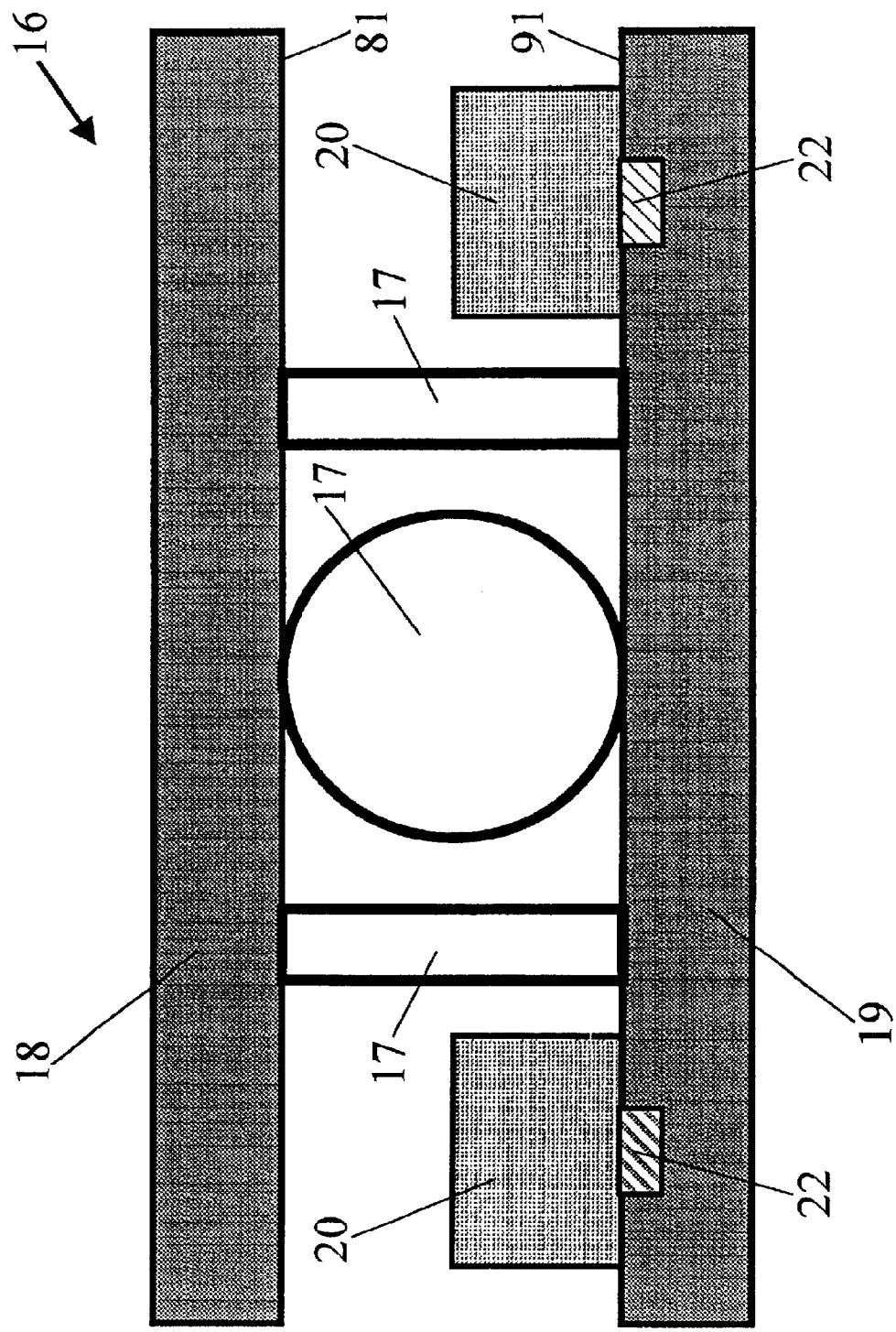
FIG. 7 is a diagrammatic elevation view, partially in section, of another embodiment of a CNF passive-active mount in accordance with the present invention, wherein three or more approximately circularly disk-shaped streamlined resilient elements are centrally situated and (at least) two sensor/actuator units are peripherally situated.
Figure 8:
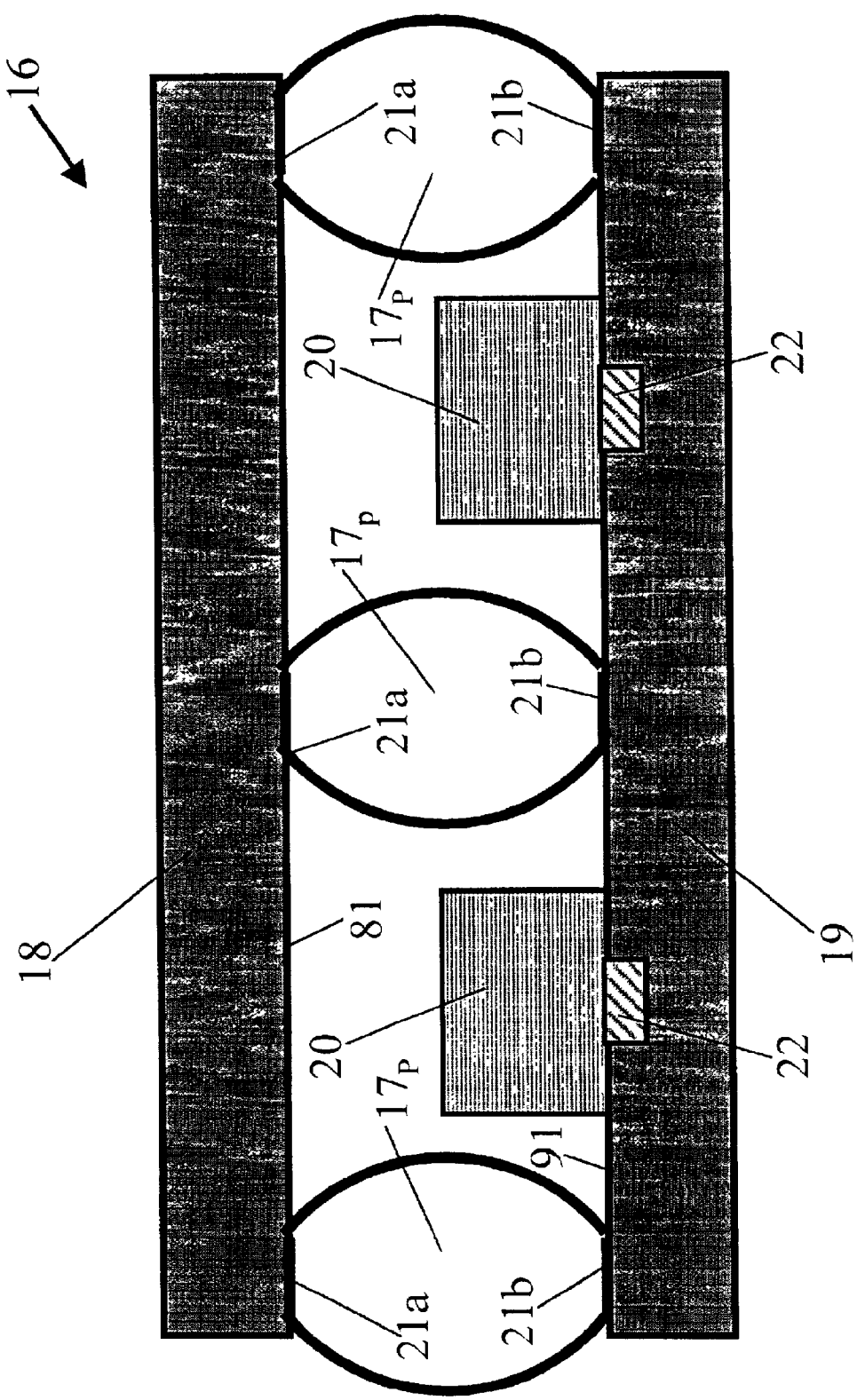
FIG. 8 is a diagrammatic elevation view, partially in section, of another embodiment of a CNF passive-active mount in accordance with the present invention, wherein one approximately oval-shaped streamlined resilient element is medially situated, at least two approximately oval-shaped streamlined resilient elements are peripherally situated, and (at least) two sensor/actuator units are intermediately situated (intermediate the medial streamlined resilient element and a peripheral streamlined resilient element).

As shown in FIG. 1 through FIG. 5, a single sensor 22 and a single actuator 20 are collocatedly paired. Reference is now also made to FIG. 6 through FIG. 8, wherein plural sensors 22 and plural actuators 20 are shown in each figure. Typically according to this invention, regardless of the numbers of sensors 22 and actuators 20, sensors 22 and actuators 20 are collocatedly paired. For each collocation the sensing of the sensor 22 and the actuation of the actuator 20 are approximately in the same, generally vertical, direction indicated by directional arrow d. If there are plural collocations, such as shown in FIG. 6 through FIG. 8, all of the collocational directions d (such as shown in FIG. 3) are approximately parallel. Mount 16 can be envisioned to have a vertical axis of symmetry, such as represented by dashed line a in FIG. 3, through plates 18 and 19. Imaginary axis a is approximately parallel to every collocational direction d and passes through center c of lower plate 16.

In FIG. 6 and FIG. 7, actuators 20 and co-located sensors 22 are seen to be symmetrically distributed with respect to center c. In arrangements such as depicted in each of FIG. 6 and FIG. 7, one resilient element 17 is positioned at center c. The single, central resilient element 17 can have any suitable shape, such as the circular cylinder or spherical shape shown in FIG. 6, or the circular disk shape shown in FIG. 7, or the oval cylinder or prolate spheroidal shape shown in FIG. 8 (streamlined resilient element $17_P$). Any number of plural (e.g., two or four) actuators 20 and any corresponding number of plural (e.g., two or four) co-located sensors 22 are collocationally positioned in a symmetrical arrangement about center c.

According to frequent inventive practice, the streamlined resilient, element(s) 17 and the collocated actuator 20/sensor 22 pair(s) are symmetrically distributed about center c (or vertical axis a) in both the "x" and "y" directions in an imaginary horizontal plane which is perpendicular to vertical axis a. FIG. 6 through FIG. 8 suggest the possibility that, in accordance with inventive principles, the streamlined resilient element(s) 17 and the collocated actuator 20/sensor 22 pair(s) be nonsymmetrically arranged about center c (or vertical axis a), or that they be arranged symmetrically in only one direction in the imaginary horizontal plane (i.e., either the "x" direction or the "y" direction). FIG. 8 also portrays the inventive utilization of plural kinds of shapes of streamlined resilient elements 17 within the same inventive mount 16. The present invention's mount 16 admits of a variety of possible combinations of elements 17 in terms of their shapes.

Figure 9:
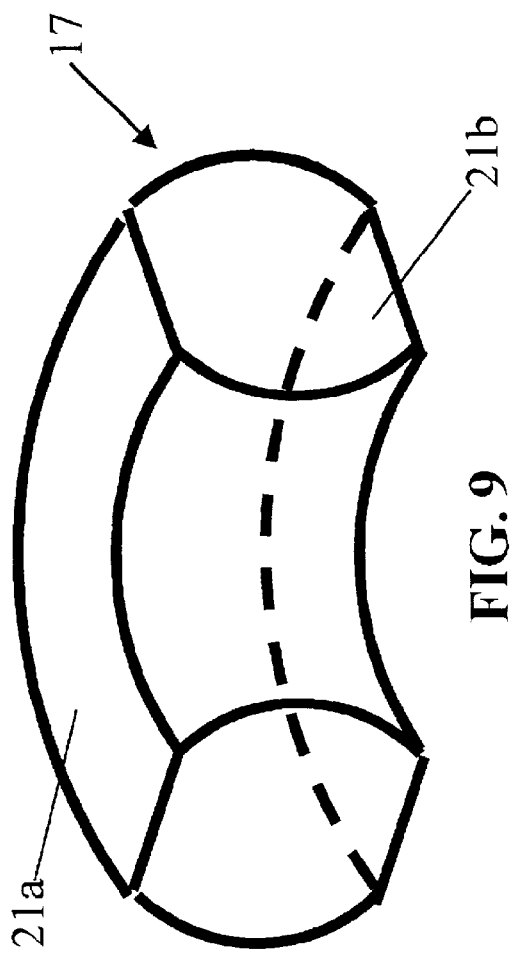
FIG. 9 is a diagrammatic perspective view, partially in section, of an embodiment of a streamlined resilient element which is shaped like a torus segment but which is truncated top and bottom.
Figure 10:
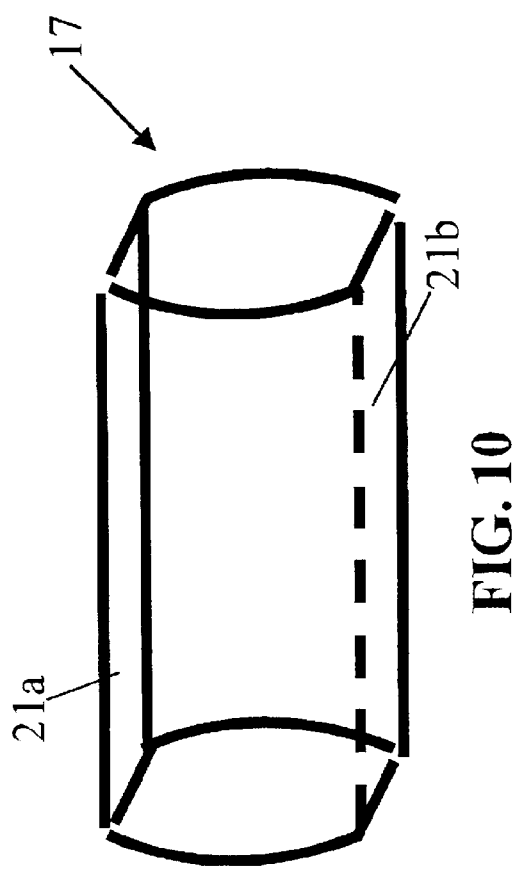
FIG. 10 is a diagrammatic perspective view, partially in section, of an embodiment of a streamlined resilient element which is shaped like a cylindrical section but which is truncated top and bottom.

A truncated streamlined resilient element is provided with at least one truncation surface 21. Again referring to FIG. 4 and also referring to FIG. 9 and FIG. 10, truncated streamlined resilient elements 17 are each provided with two opposite, approximately parallel and approximately flat (planar) truncation surfaces 21a and 21b. The top (upper) truncation surface 21a of streamlined resilient element 17 is adaptable to attachment to top (upper) plate 18 whereby top truncation surface 21a abuts the bottom (lower) surface 81 of upper plate 18. Similarly, the bottom (lower) truncation surface 21a of streamlined resilient element 17 is adaptable to attachment to bottom (lower) plate 19 whereby bottom truncation surface 21a abuts the top (upper) surface 91 of lower plate 19. Truncation surfaces 21 are also shown "edgewise" in FIG. 8 and FIG. 11 through FIG. 14. Generally in accordance with the present invention, a streamlined resilient element 17 can be (i) totally nontruncated, or (ii) truncated on one of its opposite ends or sides, or (iii) truncated on both of its opposite ends or sides.

As illustrated in FIG. 4, when inventive mount 16 is completely assembled, segmented torus-shaped streamlined resilient element 17 is disposed "sideways" so that its upper truncation surface 21a is adjacent to the lower surface 81 of upper plate 18, its lower truncation surface 21b is adjacent to the upper surface 91 of lower plate 19, and the imaginary longitudinal axis defined thereby approximately is equidistant between and parallel to the upper plate 18 lower surface 81 and the lower plate 19 upper surface 91. This inventive dispositional approach regarding streamlined resilient element 17, wherein the element 17 is laid sideways upon the lower plate 19 and is "sandwiched" between upper plate 18 and lower plate 19, similarly applies to segmented torus-shaped elements 17 (wherein the imaginary axis defined by element 17 is curved within an imaginary horizontal plane) as well as cylindrical elements 17 (wherein the imaginary axis defined by element 17 is straight within an imaginary horizontal plane). It is noted that segmented torus-shaped element 17 (shown in FIG. 9) and cylindrical section-shaped element 17 (shown in FIG. 10) can each have either a round (circular or oval) profile.

With reference to FIG. 11 through FIG. 14, usually according to this invention a streamlined resilient element 17 will define one of three basic profiles, viz., circular, non-circular vertically elongated or non-circular horizontally elongated. Each figure shows a representative profile (cross-sectional shape). In the light of this disclosure, it will be understood by the ordinarily skilled artisan that each streamlined resilient element 17 profile can represent either a "three-dimensional" curvilinear form (i.e., a form having a three-dimensional axis of symmetry, e.g., a sphere or prolate spheroid) or a "two-dimensional" curvilinear form (i.e., a form having a two-dimensional axis of symmetry, e.g., a circular-profile cylindrical section, an oval profile cylindrical section, a circular-profile torus segment or an oval profile torus segment). A "disk" is a cylinder (cylindrical section) wherein the cylinder's longitudinal axis "short" relative to the cylinder's width or diameter.

Figure 11:
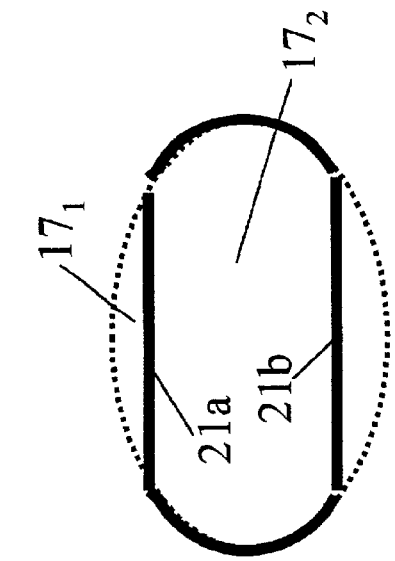
FIG. 11 is a diagrammatic elevation view of an embodiment of a streamlined resilient element which is circular in profile, particularly illustrating both a truncated form and a non-truncated form thereof.
Figure 12:
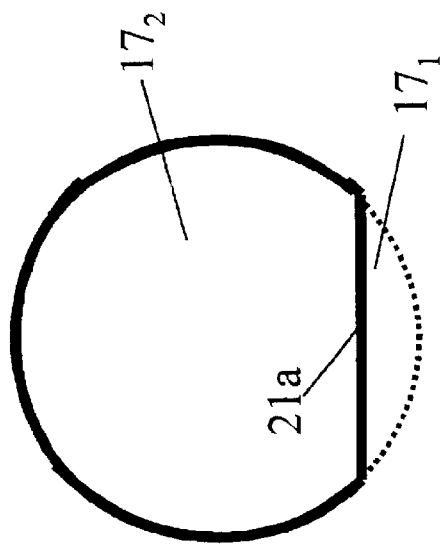
FIG. 12 is a diagrammatic elevation view of an embodiment of a streamlined resilient element which is oval in profile, and which is adaptable to being coupled with end plates which are approximately parallel to the longitudinal axis of the streamlined resilient element, particularly illustrating both a truncated form and a non-truncated form thereof.
Figure 13:
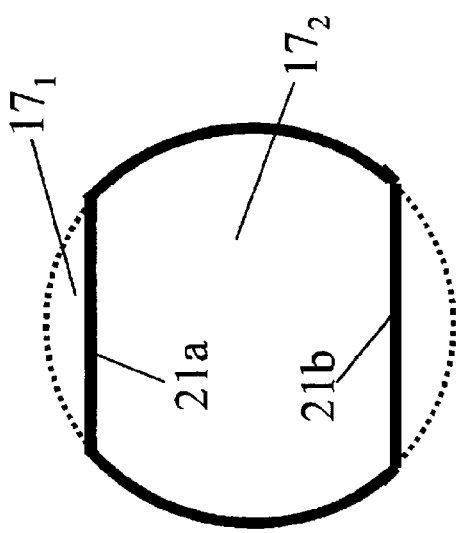
FIG. 13 is a diagrammatic elevation view of an embodiment of a streamlined resilient element which is oval in profile, and which is adaptable to being coupled with end plates which are approximately perpendicular to the longitudinal axis of the streamlined resilient element, particularly illustrating both a truncated form and a non-truncated form thereof.
Figure 14:
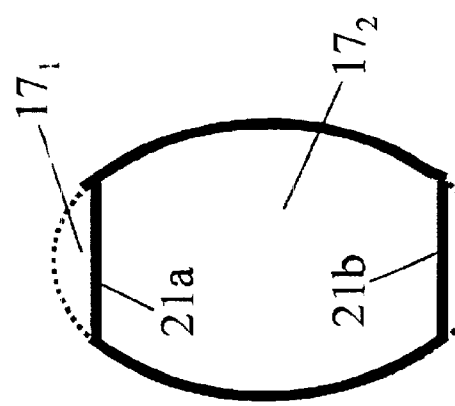
FIG. 14 is a diagrammatic elevation view similar to the view shown in FIG. 11, wherein the inventive embodiment shown of a streamlined resilient element which is circular in profile is nontruncated at the top but truncated at the bottom.

The profile shown in FIG. 11 and FIG. 14 is circular; the profiles shown in FIG. 12 and FIG. 13 are noncircular. FIG. 11 and FIG. 14 each represent a streamlined resilient element 17 which is a sphere or a circular cylinder (e.g., a circular disk) or a circular torus segment. FIG. 12 and FIG. 13 each represent a streamlined resilient element 17 which is a prolate spheroid or an oval cylinder (e.g., an oval disk) or an oval torus segment. The streamlined resilient element 17 which is shown in FIG. 12 is adaptable to joining endplates 18 and 19 along its length; the streamlined resilient element 17 which is shown in FIG. 13 is adaptable to joining endplates 18 and 19 along its width.

Notable is the possible variation, in terms of non-truncation or degrees of truncation, within a given streamlined resilient element 17 shape. In each of FIG. 11 through FIG. 14, a non-truncated streamlined resilient element 17 version (streamlined resilient element $17_1$) of streamlined resilient element 17 is completely representative of the form described thereby, whereas a truncated streamlined resilient element 17 version (streamlined resilient element $17_2$) is substantially representative of the form described thereby. The truncation can be provided at either or both ends of streamlined resilient element 17. Streamlined resilient element $17_2$ shown in FIG. 14 is truncated at the bottom end and nontruncated otherwise. If both ends of an element 17 are truncated, such truncations can differ in degree. A given element 17 can range from being entirely non-truncated to being (at either or both ends) moderately truncated to being more severely truncated.

Figure 15:
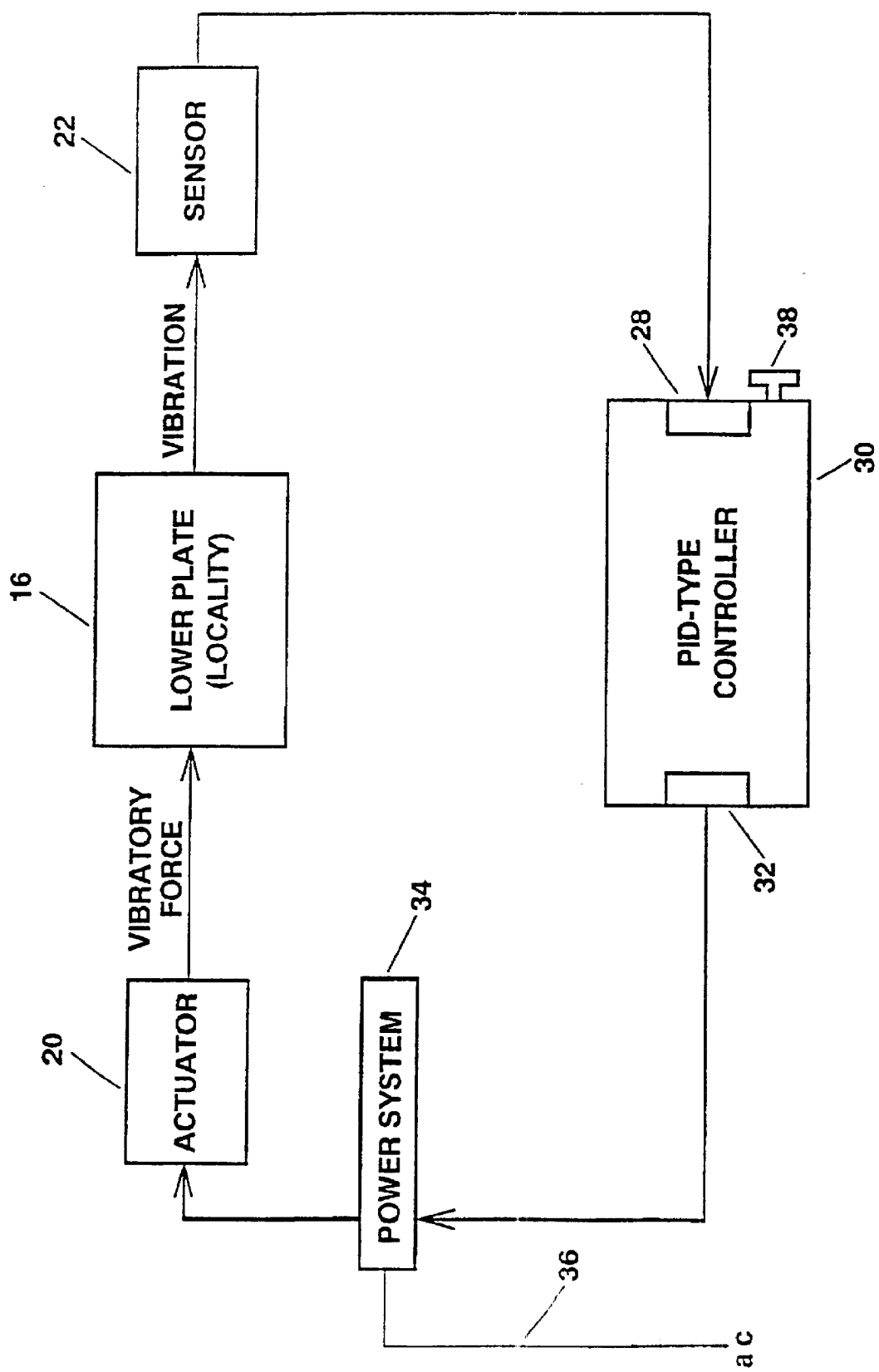
FIG. 15 is a simplified block diagram of each active subsystem control loop for an embodiment of a vibration isolation system in accordance with the present invention.

With reference to FIG. 15, for each feedback loop subsystem, a sensor is responsive to local vibration, the PID-type controller is responsive to that sensor's signal, and that sensor's companion actuator is responsive to the controller's signal. Sensor 22 is connected to an input channel 28 of PID-type controller 30. Sensor 22 responds to the localized vibration of lower plate 19 by sending a sensor signal to PID-type controller 30. Actuator 20 has a power system 34 which is connected to an output channel 32 of PID-type controller 30. PID-type controller 30 responds to the sensor signal by sending a control signal to actuator 20. Output channel 32 is connected to the power system 34 of the actuator 20 which is collocated with and companion to that particular sensor 22. Actuator 20 responds to the control signal of PID-type controller 30 by exerting a vibratory force upon the lower plate 19 locality. Power cord 36 is "plugged into" an ac outlet, in a manner which is conventional for electronic equipment. Knob 38 of controller 30 is used for manually adjusting performance of the particular active control subsystem.

For example, an inventive vibration isolation system embodiment which includes an inventive mount embodiment such as shown in FIG. 6, FIG. 7 or FIG. 8 can be envisioned. Each one of plural (e.g., two or four) sensors 22 is connected to a corresponding one of plural (e.g., two, three or four) input channels 28, and the collocated one of plural (e.g., two or four) actuators 20 uses a power system 34 connected to all of the (e.g., both, all three or all four) output channels 32. As another example, an inventive vibration isolation system embodiment which includes an inventive mount embodiment such as shown in FIG. 1 through FIG. 5 would be characterized by the connection of a single sensor 22 to a single input channel 28, and by the utilization by the single collocated actuator 20 of a power system 34 which is connected to a single output channel 32.

Controller 30 as depicted in FIG. 15 has one control knob 38 which is for adjustment of the performance, based on frequency response, for one or more sensors of a particular inventive embodiment, e.g., sensors 22 of inventive mount (spring assembly) 16. In inventive practice, the processor/controller can implement one or more control knobs or dials, manually operated for modulation purposes. Each knob 38 is tuned by the operator for performance, the performance being realized by the frequency response of the corresponding sensor or sensors 22. A frequency response indicator or display device for each sensor 22 can be designed and built into inventive mount 16, or can be otherwise conveniently located, e.g., below, next to or near inventive mount 16.

For many inventive embodiments, use of a single knob 38 for collective adjustment facilitates operation; it may be pragmatic that a single knob 38 be implemented for a plurality of sensors 22, or even for the entire group of sensors 22 for a given application, because the sacrifice in terms of tuning "fineness" is secondary to the gain in terms of ease of operation. Alternatively, each sensor 22 can have corresponding thereto its own knob 38; for example, as regards inventive mount 16 such as shown in FIG. 6 or FIG. 7, controller 30 can be envisioned to have plural (e.g., four) knobs 38, each knob 38 corresponding to one sensor 22 for inventive mount 16.

Sensors 22 are preferably velocity sensors 22 for many embodiments of this invention, wherein simple velocity feedback can thus be effectuated. Some inventive embodiments preferably employ sensors 22 which are accelerometers 22. Incorporated herein by reference are the following two United States patents, viz., to Geohegan, Jr. et al. at U.S. Pat. No. 4,083,433, and to Phillips et al. at U.S. Pat. No. 4,922,159. Geohegan, Jr. et al. are instructive regarding active vibration control based on sensing of vibration velocity, and Phillips et al. are instructive regarding active vibration control based on sensing of vibration acceleration.

Conventional passive mounts work on the principle of low dynamic load transmissibility by virtue of their resilient material property. They are designated "passive" because their function is based on their inherent property instead of their ability to react to the in-situ condition. A conventional passive vibration isolation mount is not as effective as one might expect for a practical foundation having resonant frequencies within the bandwidth of interest. Moreover, low frequency enhancement is a characteristic of conventional passive mounts; due to their inherent low frequency resonance, conventional passive mounts may be ineffective or may even cause enhancement of dynamic load transmission at low frequency. On the other hand, in the case of active load transmissibility control, a much higher local impedance is created by an actuator which can be very effective with proper controller design but which suffers from limited mechanical response at high frequency. The present invention uniquely blends "the best of both worlds," so to speak, namely the passive vibration control realm and the active vibration control realm, so as to complement each other in terms of obviation of each other's weaknesses as well as overall vibration suppression effectiveness.

An inventive CNF passive-active mount 16, wherein one or more inertia actuators 20 are applied to lower attachment plate 19, not only can remedy problems associated with a realistic foundation but can also enhance performance so that it exceeds what performance would be on an ideal rigid foundation. Many inventive embodiments preferably use collocated velocity feedback, which is the simplest and perhaps most widely used vibration suppression algorithm. The controller design for the inertia actuators pursuant to collocated velocity feedback is uncomplicated. The collocated velocity feedback design concept has universal application; it is applicable to any dynamic system. Additionally, the required actuator, force is typically undemanding for an inventive CNF passive-active mount. An inventive CNF passive-active mount generally requires very little power and force capacity from the actuators—i.e., a small percentage of the disturbance force above the mount—in order to be effective for frequencies higher than the resonant frequency of the mount itself. Furthermore, for small-scale machinery or delicate equipment, the low frequency enhancement can also be reduced, if desired, since the required actuator output force capacity is within the hardware limitation.

Generally, when an inventive CNF passive-active mount is oriented vertically such as generally depicted in FIG. 1 through FIG. 8, its passive vibration isolation mode will inherently provide better vibration isolation in transverse (i.e., horizontal) directions than in axial (i.e., vertical) directions, since the transverse spring rate normally will be lower than the axial spring rate. Hence, normally in inventive practice, lateral stability of the mounted object will be of greater concern than the degree or sufficiency of transverse vibration isolation. Nevertheless, for some inventive embodiments, the requirements or specifications may be so stringent as to demand even better transverse vibration isolation than is intrinsically passively provided by the inventive resilient CNF mount. If such is the case, for example, an inventive CNF passive-active mount can be oriented horizontally and situated between an object and a vertical restraining member. For instance, each inventive CNF passive active mount 16 represented in the figures can be envisioned to be is oriented horizontally and situated between machinery 24 and foundation 26. For instance, each inventive mount 16 can be oriented horizontally and situated between a vertical surface of machinery 24 and a vertical component of a bracket, wherein the horizontal component of the bracket is attached to horizontal foundation 26, and the vertical component of the bracket is attached to the mount's vertical lower plate 19.

As another example, vertically oriented inventive CNF passive-active mount 16 can include one or more collocated pairs of sensors 22 and actuators 20 whereby the collocatedly paired sensing and actuating functions are approximately in the same transverse direction, such as indicated by directional arrow t in FIG. 2 and FIG. 3. For instance, inventive mount 16 can be envisioned in FIG. 2 and FIG. 3 to have one or more (e.g., two opposite) perimetric collocated sensor 22-actuator 20 pairs having a first transverse direction $t_1$; and/or, one or more (e.g., two opposite) perimetric collocated sensor 22/actuator 20 pairs having a second transverse direction $t_2$ which is orthogonal with respect to first transverse direction $t_1$; and/or, one or more (e.g., two opposite) central collocated sensor 22-actuator 20 pairs having axial direction d which is orthogonal with respect to both first transverse direction $t_1$ and second transverse direction $t_2$.

Alternatively, inventive CNF passive-active mount 16 can be envisioned to include one or more triaxial sensor-actuator units. Each triaxial unit has three collocated sensor 22-actuator 20 pairs oriented in three orthogonal directions, e.g., two transverse directions and an axial direction. That is, in Cartesian space, a first orthogonal direction is along or parallel to the x axis, a second orthogonal direction is along or parallel to the y axis, and a third orthogonal direction is along or parallel to the z axis. In the light of the teachings herein, practice of an inventive CNF passive-active mount 16 so as to be instrumented with one or more such triaxial units 42 should be within the capability of the ordinarily skilled artisan. Triaxial sensors are commercially available; triaxial actuators have been custom-designed, e.g., for industrial plants, and can be specially ordered from manufacturers.

Diverse integrated designs of inventive mount 16, in terms of kids and arrangements of the passive and active components, are possible in accordance with the present invention. As portrayed in FIG. 1 and FIG. 4, which are conceptually similar, four "short" element 17 cylinders (alternatively referred to as "disks") of resilient material are located on four sides of CNF mount 16 so as to surround a lower profile (less tall) inertial actuator 20 which is located at the center c. The prototype CNF mount 16 design shown in FIG. 4 was fabricated for conducting the physical test demonstration of the present invention.

Figure 16:
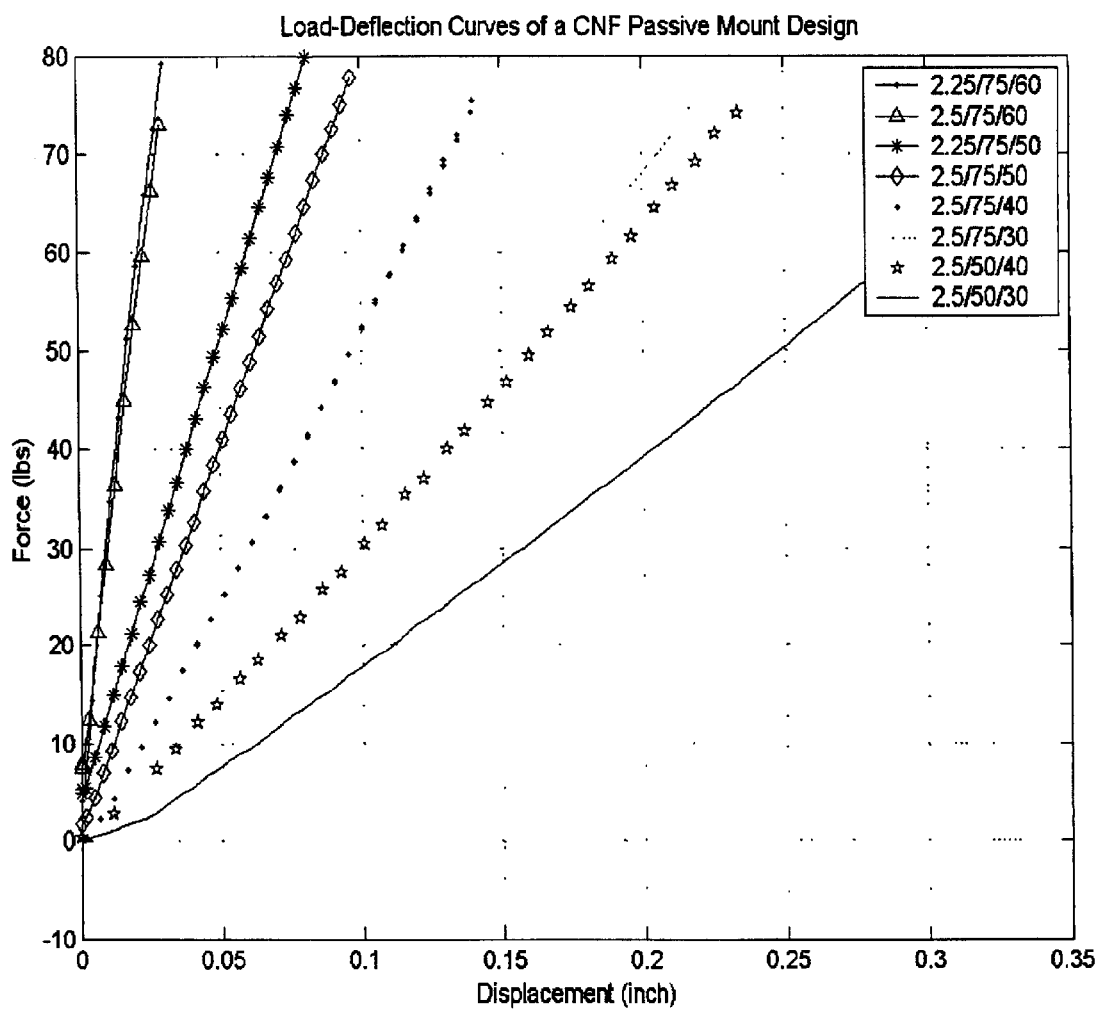
FIG. 16 is a graphical representation of the load-deflection curves, in terms of force (pounds) versus displacement (inches), which were ascertained for eight prototypical versions of the prototypical inventive embodiment shown in FIG. 4, wherein the eight prototypical versions were characterized by various combinations of three parameters (viz., lengthwise diameter in inches, thickness in inches, and durometer number) pertaining to each of the four streamlined resilient elements. The prototypical inventive embodiment shown in FIG. 4, which represents one of these eight prototypical versions, has a lengthwise diameter of 2.5 inches, a thickness of 0.75 inches, and a durometer number of 40.

Referring to FIG. 16, depending on the material, thickness and diameter of the short element 17 cylinders, the mount 16 stiffness varies. Several combinations of these design parameters were fabricated. The respective load-deflection curves of the different mount 16 designs are shown in FIG. 16, wherein the legend indicates, in order: the diameter of each element 17; the thickness of each element 17; and, the durometer number of the natural rubber of which each element 17 was made.

As shown in FIG. 16, the load-deflection curves are for the calculation of the compression stiffness. For the prototype design, the combination Of design parameters of 2.5"/ 0.75"/40 (diameter/thickness/Durometer Shore A) was chosen; the curve pertaining thereto has about the medium stiffness and provides a mount frequency at around 10 Hz regardless of the isolation weight. This constancy of frequency regardless of the isolation weight represents an important feature of the present invention's CNF design concept. The shear or lateral stiffness was not measured; however, it could be estimated to be at least one order lower because of the much greater flexibility which could be felt by hand. Consequently, the present invention's CNF mount 16 decouples the shear vibration from the compression vibration, thereby achieving superior passive isolation effect in the shear direction and eliminating the need for the active component in the shear direction FIG. 16 shows the curves which; were used, pursuant to inventive testing, to obtain the suitable stiffness(es) for the particular inventive CNF mount design(s) being tested. In theory, the present invention's CNF passive-active mount is supposed to demonstrate an upward bending of each load-deflection curve, indicating in increase in stiffness as the load is increased, thereby achieving the "constant natural frequency," which represents the ratio of the stiffness to the load (or, synonymously, the weight). However, this behavior is not illustrated entirely dearly in FIG. 16, because the load range is not large enough. The load-deflection curve's behavior of bending upward is more pronounced if the load range is greater. Since the data collected pursuant to inventive testing was intended to demonstrate the performance of particular inventive CNF passive-active mounts, the testers did not bother to increase the load level beyond what they designed for the demonstration. Nevertheless, the reader's attention is directed to the "softer" curves (e.g., the star symbol curve representing 2.25"/0.75"/50 and the solid line curve representing 2.5"/0.50"/30) in FIG. 16, wherein this trend of bending upward is more readily observed. As previously noted herein, according to typical inventive embodiments, the significant range of loading corresponding to natural frequency constancy is between a minimum degree of loading and a maximum degree of loading, wherein the maximum degree of loading is no less than about ten times the minimum degree of loading, and wherein the maximum degree of loading is no more than about one hundred times the minimum degree of loading.

Figure 17:
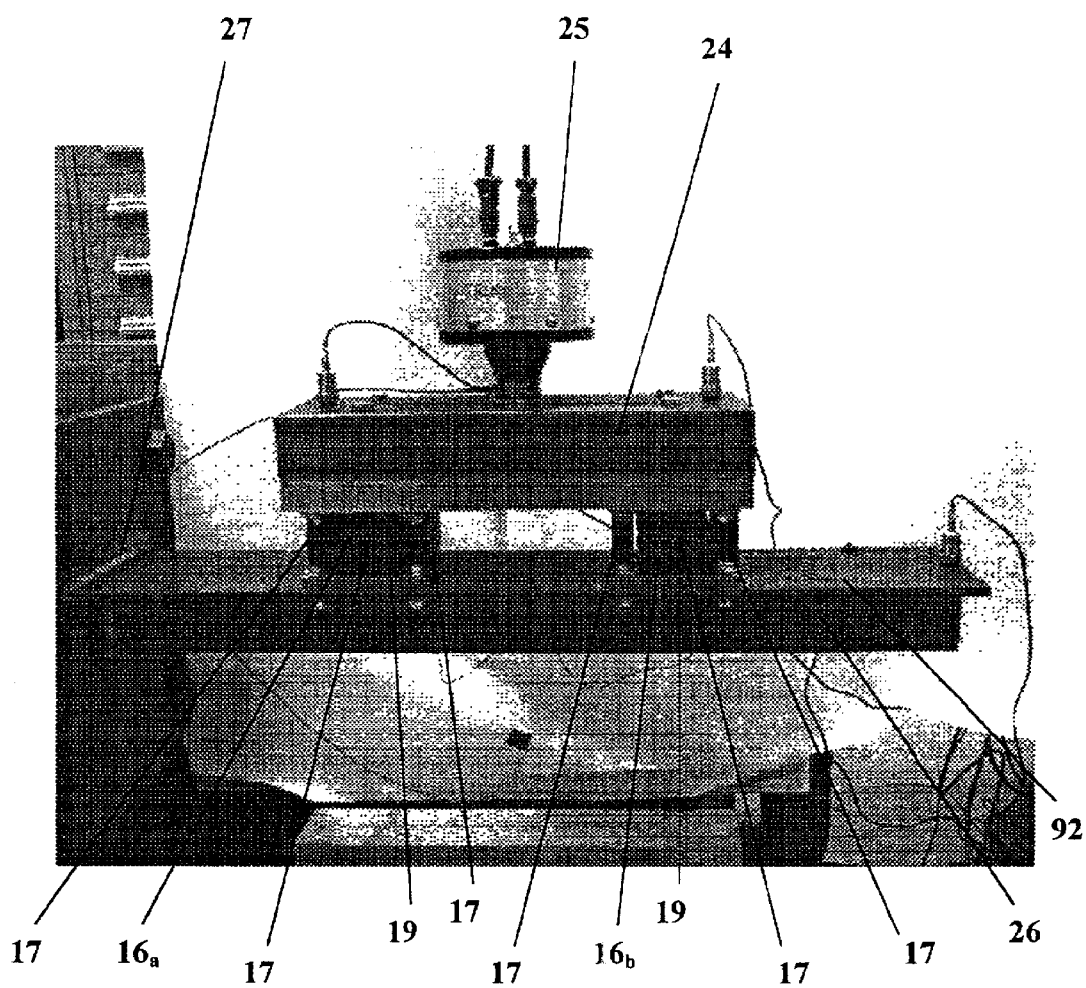
FIG. 17 is a photographic perspective view of a demonstration test rig which was used in association with the prototypical inventive embodiment shown in FIG. 4.

With reference to FIG. 17, a demonstration test was conducted of the present invention's CNF passive-active prototype mount 16 shown in FIG. 4. In furtherance of a hardware demonstration of the performance of the present invention's CNF passive-active mounts, a simple test rig was designed and fabricated as follows: A machine 24 (mass block of 6 inches by 3 inches by 14.75 inches) weighing 75 pounds, with its largest dimension of 14.75 inches in the axial direction, was mounted onto a cantilever T-beam 26 by two CNF passive-active mounts 16a and 16b at both ends, as shown in FIG. 17. The cantilever beam 26 was made of steel of "T" cross-section (WT 3×10) weighing 24.5 pounds with a length of 29.125 inches. The mass block 24 was located in the middle of the steel beam 26 span; that is, the mid-span of mass block 24 was at the mid-span of T-beam 26 along the length. This cantilever beam 26 was the elastic machinery foundation, having a structural loss factor of 1 percent and a mass ratio (machinery/foundation) of about 3.0. T-beam 26 had the first fundamental frequency of 93 Hz and a second 485 Hz in bending and the first longitudinal resonance frequency at 1703 Hz.

The passive component (streamlined resilient element) 17 of the CNF passive-active mount was made of natural rubber with a nominal loss factor of 0.1. Depending on the design of passive component 17—for example, the shape factor and the geometric parameters (e.g., diameter, hardness and thickness of the short cylindrical elements 17)—the compression mount frequency for this particular design was about 10 Hz. For the active component, a MOTRAN brand inertial actuator 20 and an accelerometer 22 in its vicinity formed a "collocated" actuator/sensor pair in the perpendicular direction to the mounting surface 92 of T-beam 26. In this demonstration, the actuator command signal was controlled by the negative velocity feedback with a constant gain. The manufacturer of inertial actuator 20 was Motran Industries, Inc., 25570 Rye Canyon Road, Unit J, Valencia, Calif., 91355.

Reference is now made to FIG. 18 through FIG. 22. With the disturbance force applied from the shaker 25 on top of the block mass 24 in the vertical direction, the responses below each of inventive CNF passive-active mount 16a and 16b in the vertical direction of the cantilever beam 26 were measured. Both the acceleration responses to the passive component only of the inventive CNF passive-active mounts 16 and the normal operation of the inventive CNF passive-active mounts 16 in the frequency up to 1000 Hz were recorded for comparison.

Figure 18:
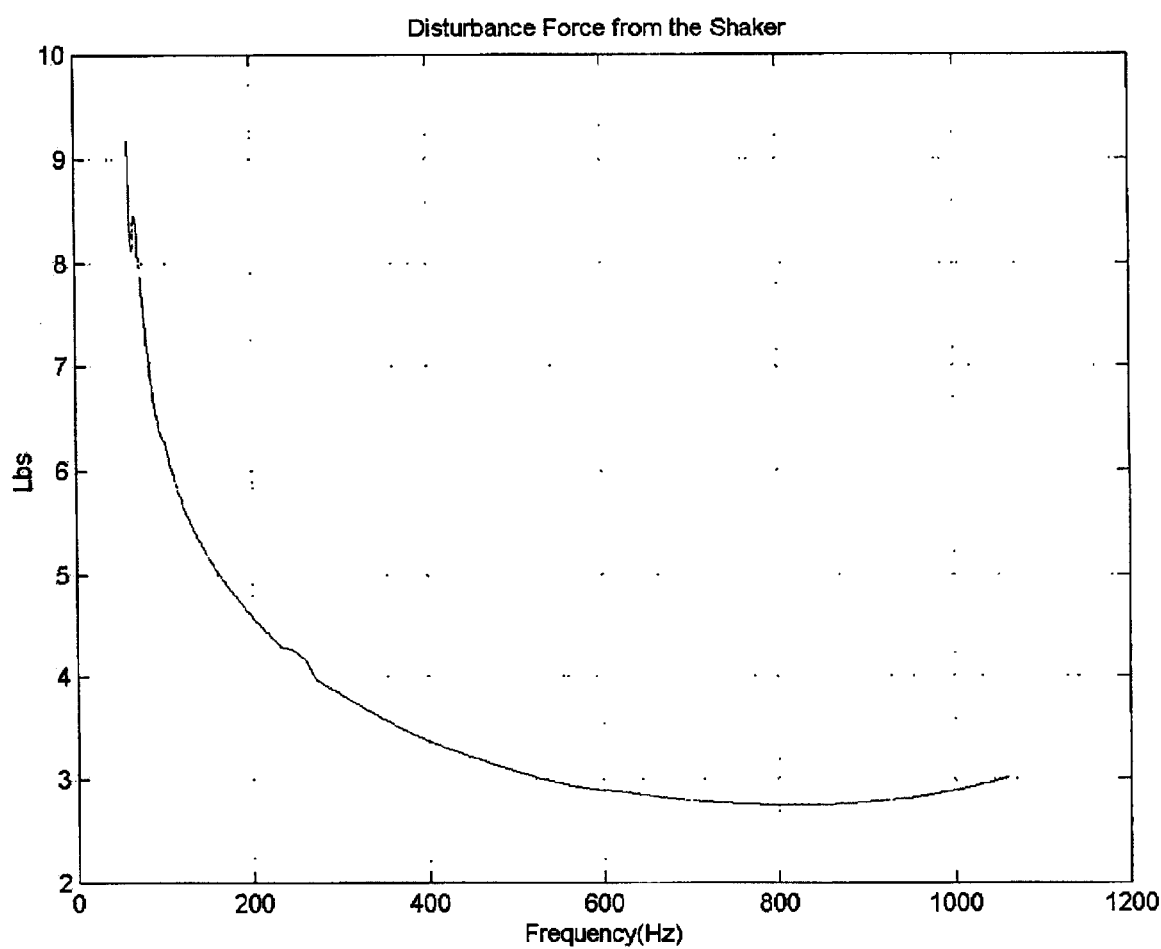
FIG. 18 is a graphical representation of the disturbance force from the shaker in terms of weight (pounds) versus frequency (Hz). This graph is based on disturbance force data which were obtained during inventive testing, using the demonstration test rig shown in FIG. 17, of the prototypical inventive embodiment shown in FIG. 4.
Figure 19:
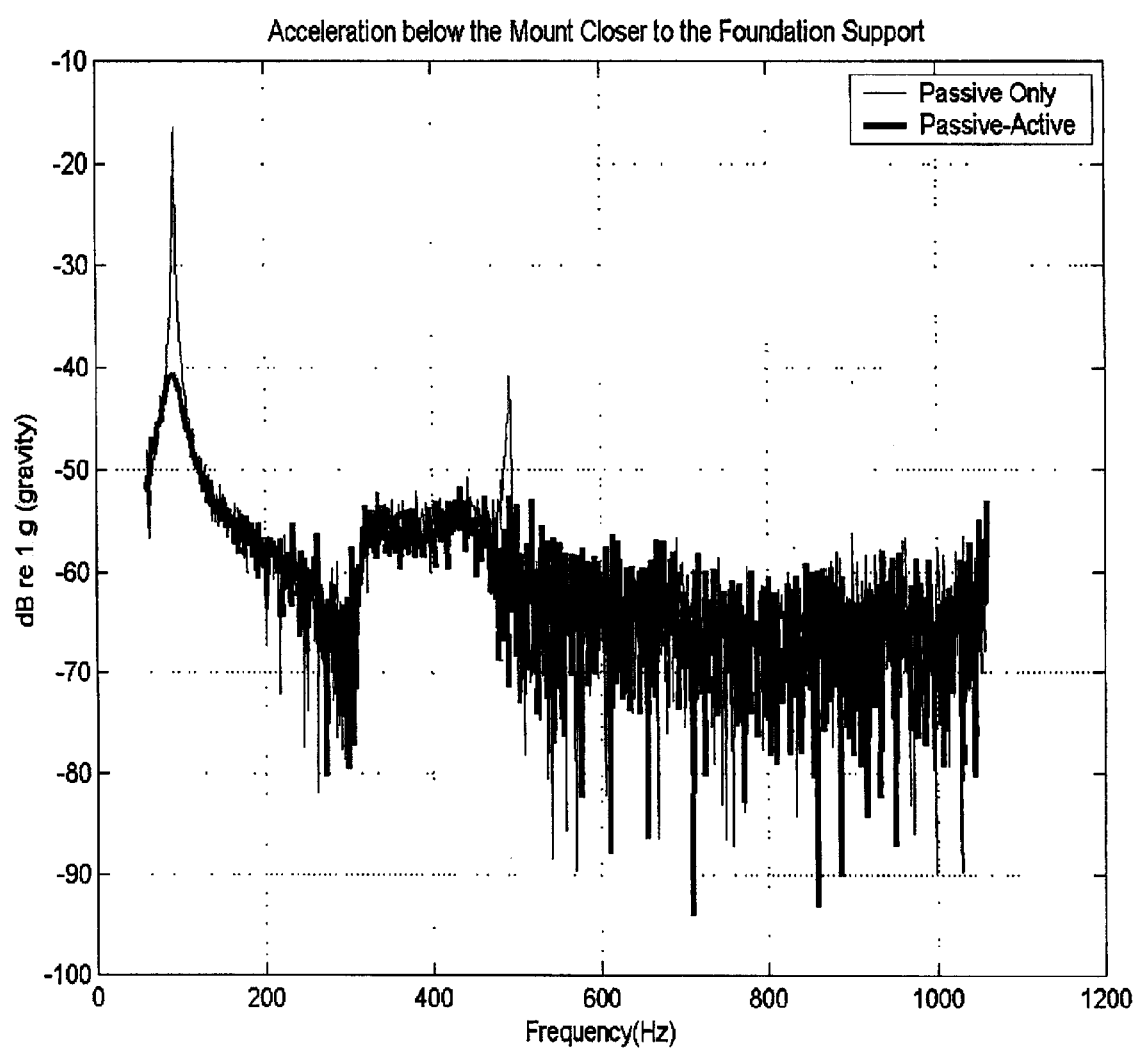
FIG. 19 is a graphical representation of the acceleration, in terms of dB per g versus frequency (Hz), which existed below the inventive CNF passive-active mount and closer to the foundation support. This graph is based on acceleration data which were obtained during inventive testing, using the demonstration test rig shown in FIG. 17, of the prototypical inventive embodiment shown in FIG. 4.
Figure 20:
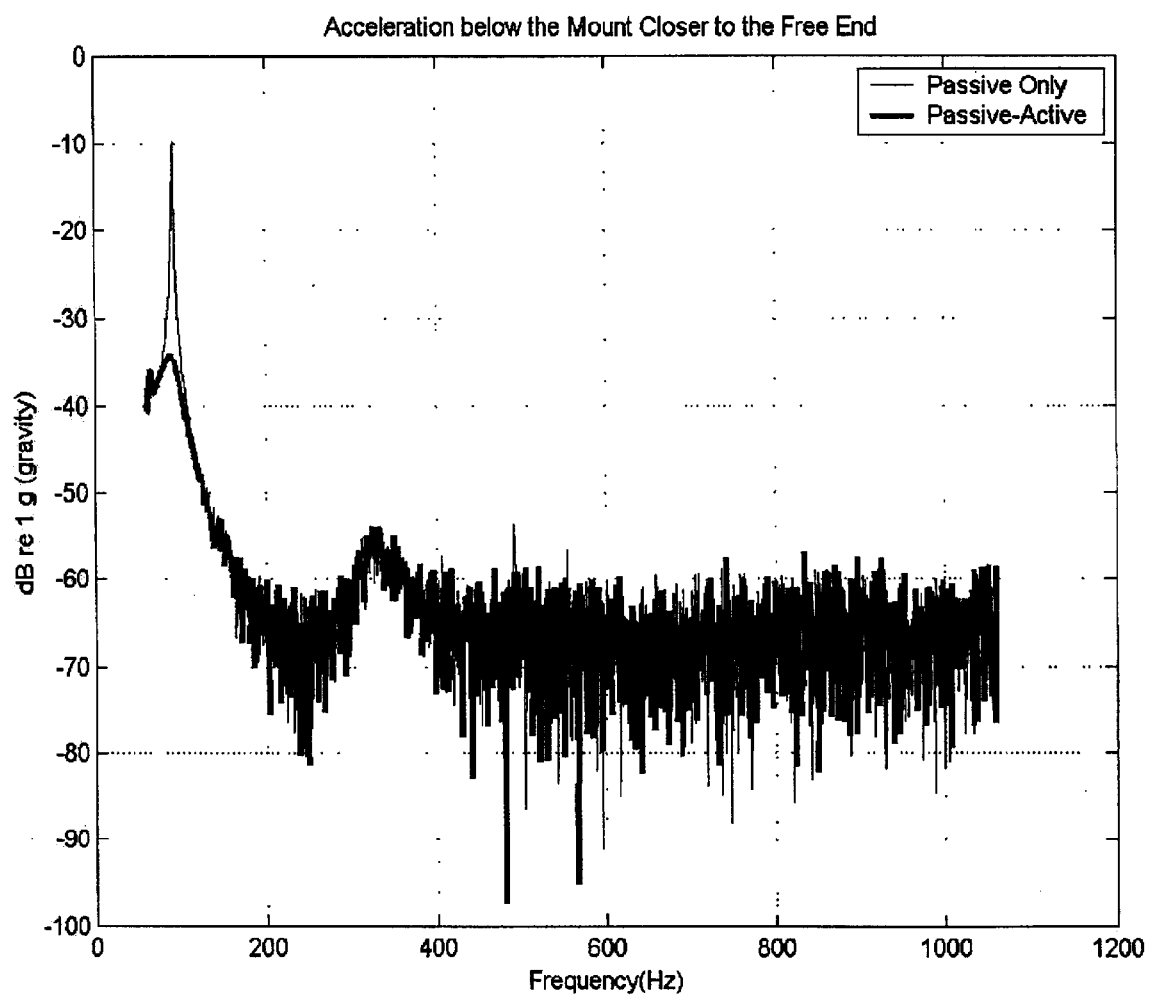
FIG. 20 is a graphical representation of the acceleration, in terms of dB per g versus frequency (Hz), which existed below the inventive CNF passive-active mount and closer to the free end (the end opposite the foundation support). This graph is based on acceleration data which were obtained during inventive testing, using the demonstration test rig shown in FIG. 17, of the prototypical inventive embodiment shown in FIG. 4.

The acceleration below mount 16a (the mount 16 located closer to the foundation support 27, ie., closer to the fixed end of T-beam 26) is shown in FIG. 19, subject to the vertical disturbance force from the shaker as shown in FIG. 18. Since the velocity feedback gain was moderate, the inertial actuator 20 in this mount simply worked as an efficient broadband vibration damper, thus representing the function of the inertial actuator 20 in the inventive CNF passive-active mount. This is also shown in FIG. 20 for mount 16b (the mount located further from the foundation support 27, i.e., closer to the free end of T-beam 26). The mounting location for mount 16b (the location closer to the free end of T-beam 26) had lower impedance than did the mounting location for mount 16a (the location closer to the fixed end of T-beam 26); therefore, mount 16b (located closer to the free end of T-beam 26) had greater response than did mount 16a (located closer to the fixed end of T-beam 26) by about 7 dB.

Figure 21:
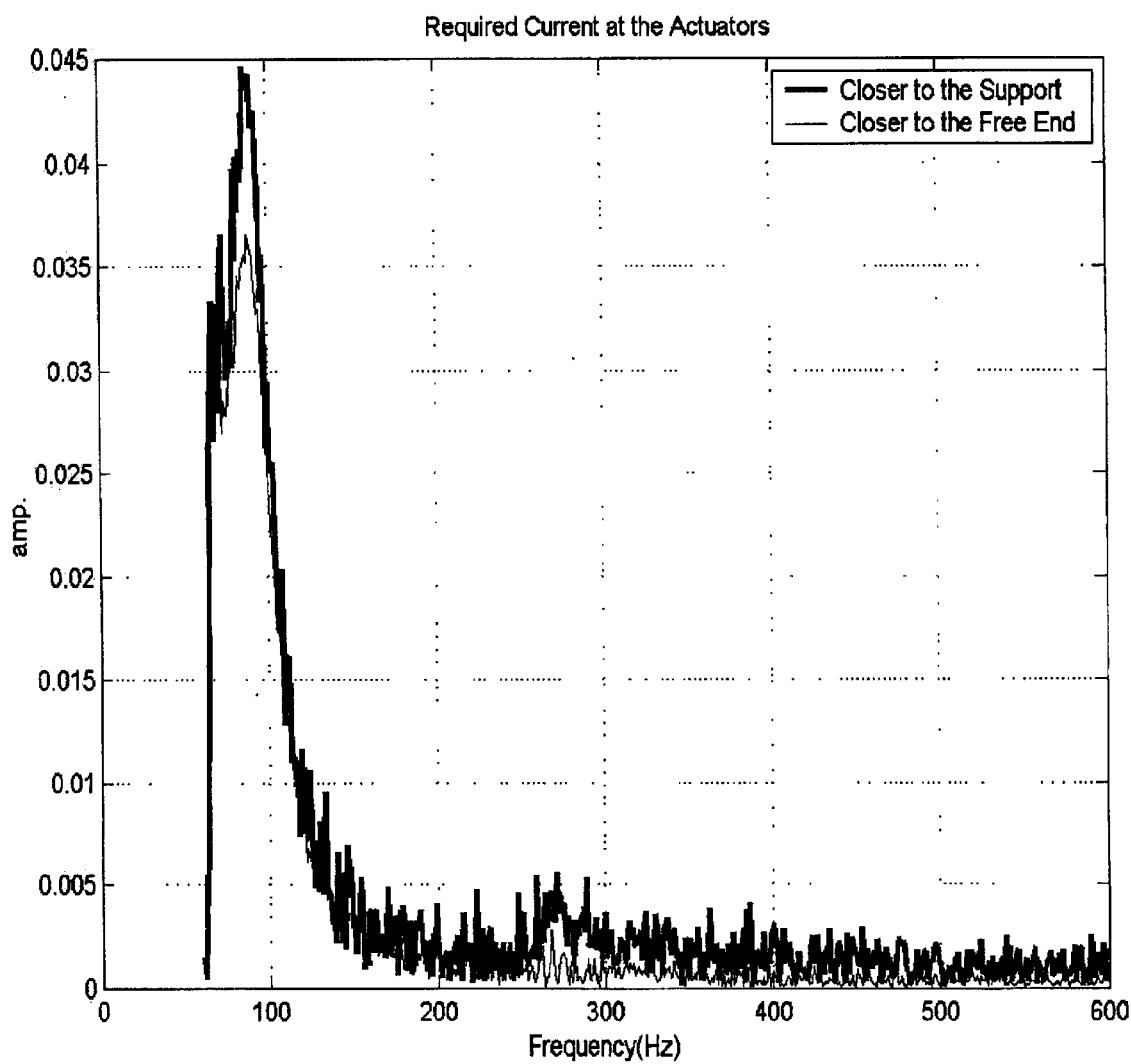
FIG. 21 is a graphical representation of the required current per actuator, in terms of amperes versus frequency (Hz). This graph is based on current data which were obtained during inventive testing, using the demonstration test rig shown in FIG. 17, of the prototypical inventive embodiment shown in FIG. 4.
Figure 22:
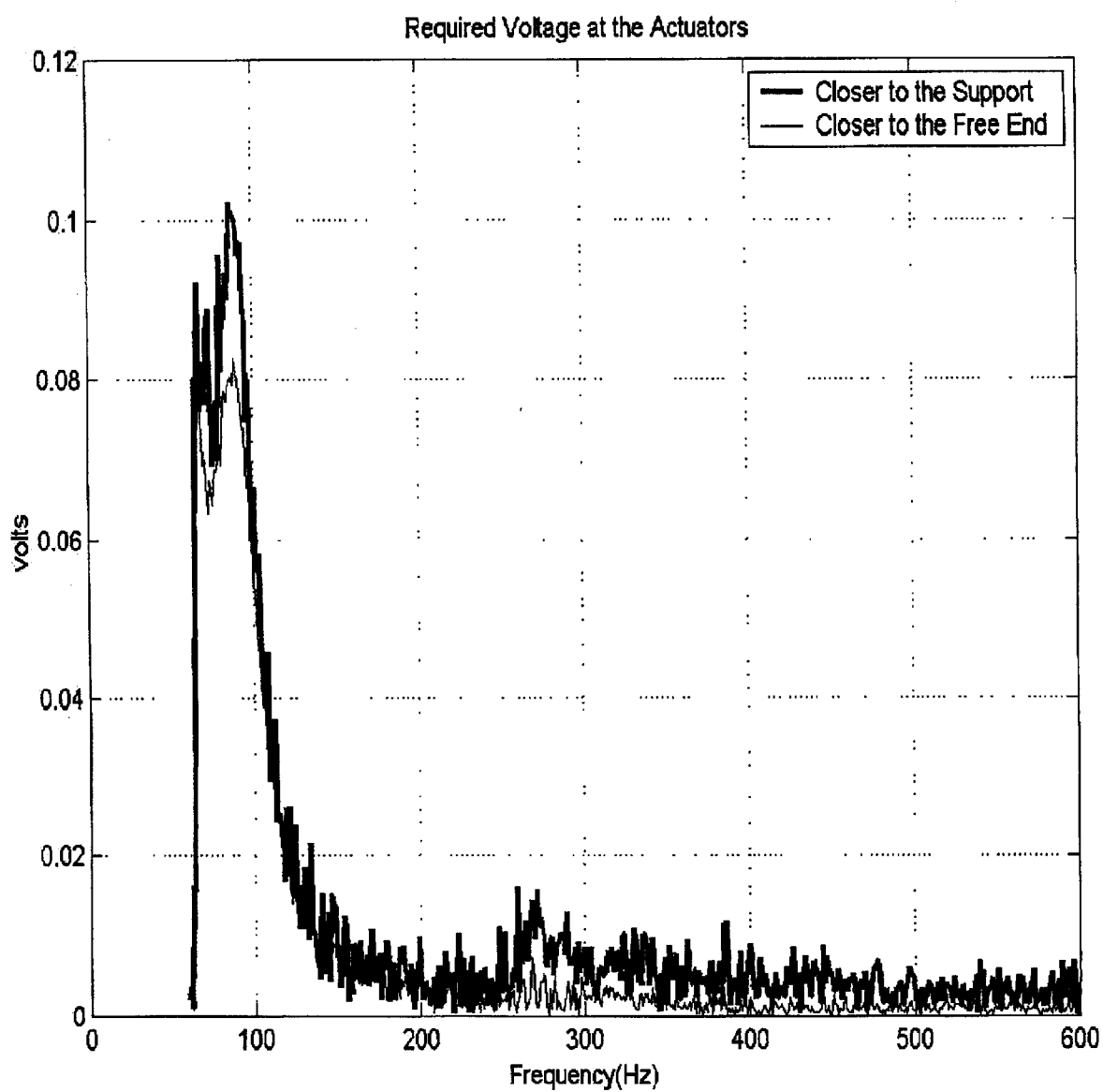
FIG. 22 is a graphical representation of the required voltage of the actuators, in terms of volts versus frequency (Hz). This graph is based on voltage data which were obtained during inventive testing, using the demonstration test rig shown in FIG. 17, of the prototypical inventive embodiment shown in FIG. 4.
Figure 23:
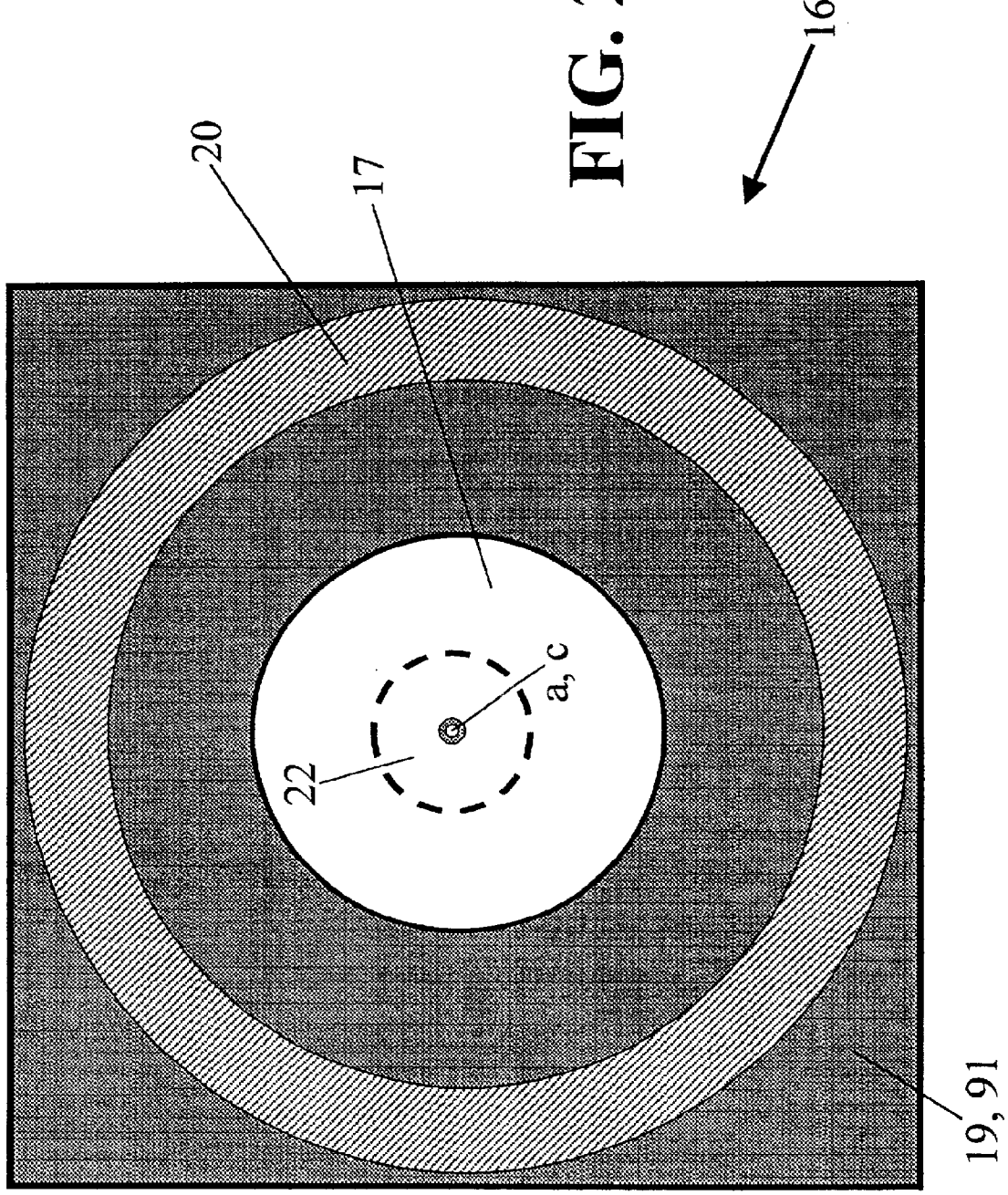
FIG. 23 is a diagrammatic top plan view, sans upper plate and partially in section, of an inventive embodiment having a peripherally situated annular actuator, a centrally situated sensor and a centrally situated streamlined resilient element (with diameter comparable to the length/width of the attachment plates).
Figure 24:
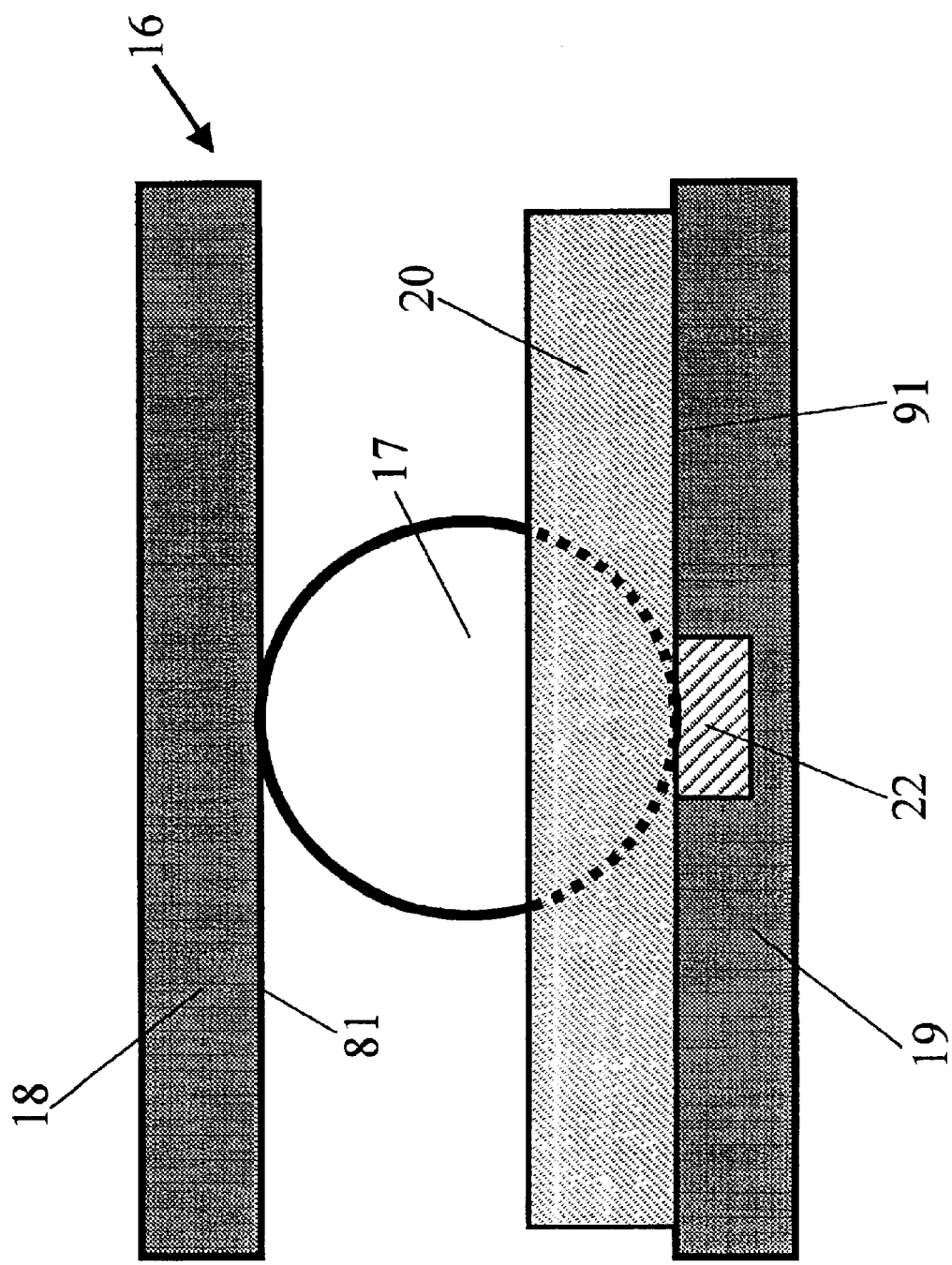
FIG. 24 is a diagrammatic elevation view, partially in section, of the inventive embodiment shown in FIG. 23.

As shown in FIG. 21, the measured actuator 20 current at mount 16a (located closer to the free end of T-beam 26) was, in general, smaller than the measured actuator 20 current at mount 16b (located closer to the free end of T-beam 26). This is mainly due to the smaller gain used for the actuator closer to the free end. This was also true for the measured actuator 20 voltage, as shown in FIG. 22. The levels of current and voltage used in this demonstration were less than 3 percent of the rated capacity of this particular model of the MOTRAN actuator.

It is recalled that some inventive embodiments provide a centrally located streamlined resilient element 17 and peripherally located plural actuators surrounding element 17, such as shown in FIG. 6. Now referring to FIG. 23 through FIG. 26, it may be preferable to adopt a different inventive configuration when the passive components (element or elements 17) are centrally located. As shown in FIG. 23 through FIG. 26, rather than placing plural separate actuators 20 around the central element(s) 17, instead a single annular actuator ("ring-actuator") 20 can be placed around the central element(s) 17.

Figure 25:
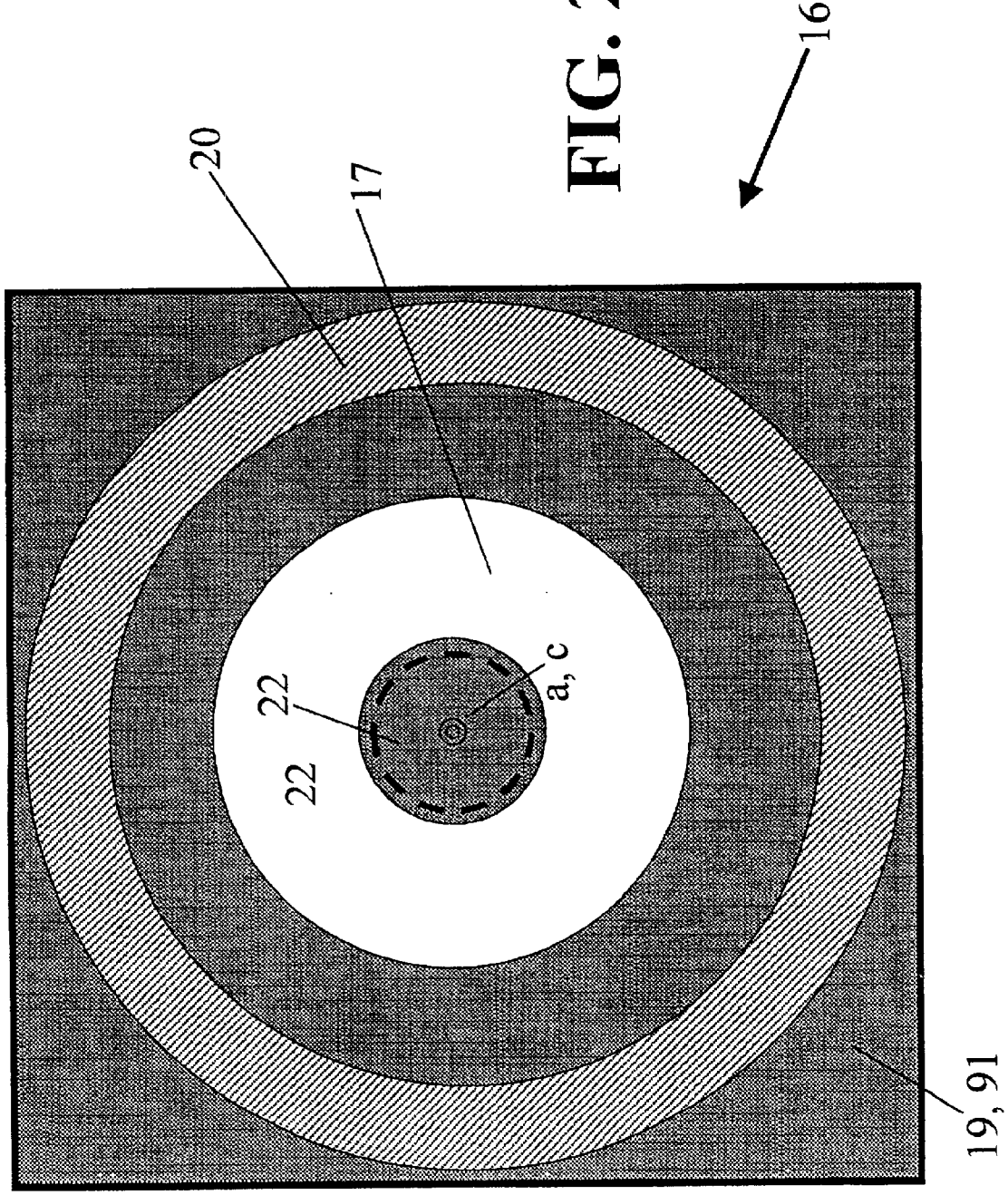
FIG. 25 is a diagrammatic top plan view, partially in section, of an inventive embodiment Similar to that shown in FIG. 23 and FIG. 24, wherein the centrally situated streamlined resilient element is a complete (nonsegmented) torus.

FIG. 5 is illustrative of the advantageousness of using plural, discrete, peripherally situated torus-segment shaped elements 17, as distinguished from using a single peripherally situated torus-shaped element 17 which can be envisioned based on FIG. 5. A single peripheral torroidal element 17 would tend to generate excessive heat, or impede the dissipation of excessive heat. In fact, the prevention of such excessive heat is an underlying principle for the preference of using plural discrete streamlined resilient elements 17 about the periphery, since the spaces in between the elements 17 encourage escape or attenuation of unwanted heat. Hence, the implementation of a torus-shaped element 17 is possible according to this invention, but thermal considerations should not be overlooked. A relatively small, centrally located torus-shaped element 17, such as shown in FIG. 25, would probably avoid or minimize such heat-related problems.

Figure 26:
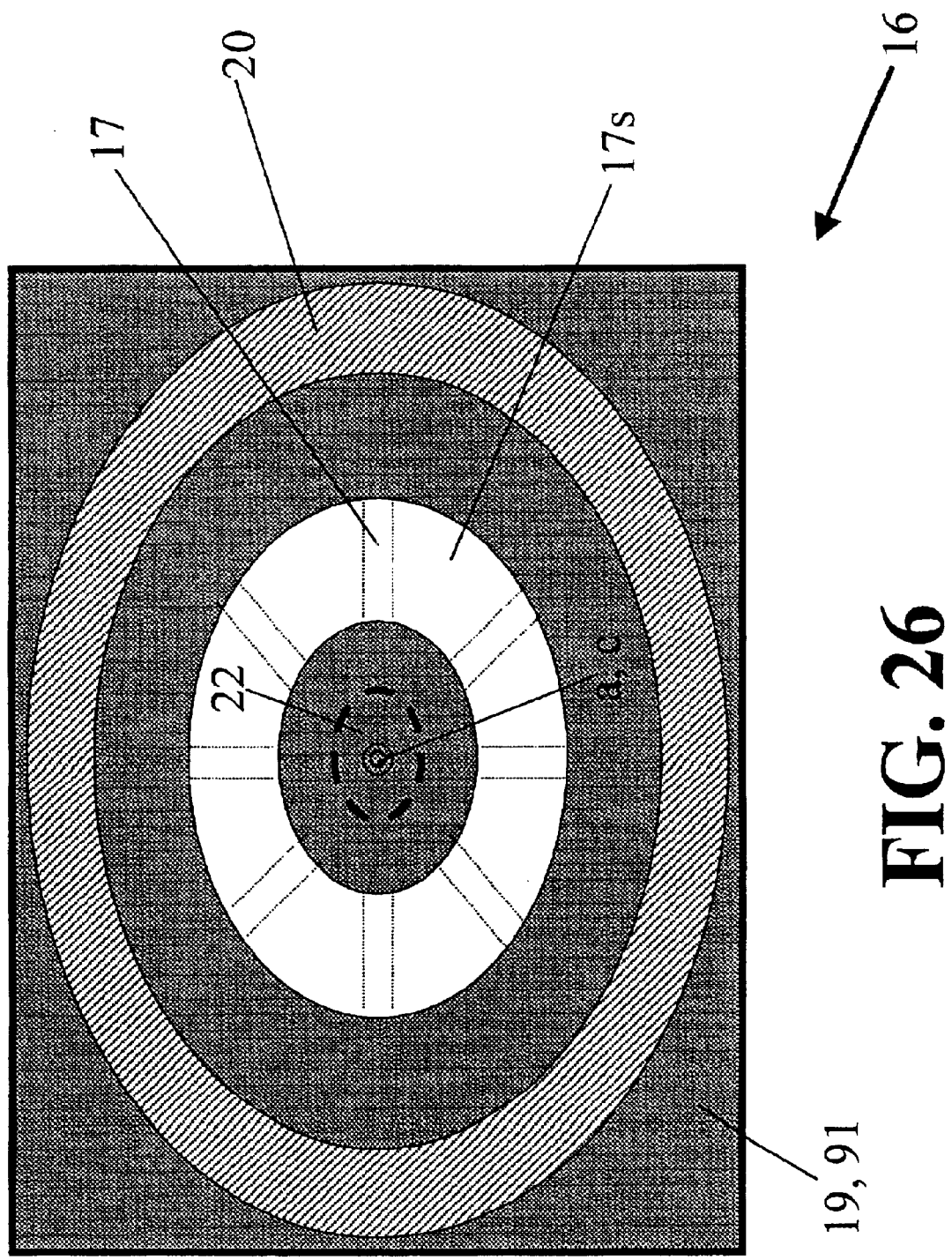
FIG. 26 is a diagrammatic top plan view, partially in section, of an inventive embodiment similar to that shown in FIG. 25, wherein the centrally situated streamlined resilient element is noncircularly toroidal rather than circularly toroidal as shown in FIG. 25.

As shown in FIG. 5, the four congruent segmentedly toroidal elements 17 define a circular shape in the imaginary horizontal geometric plane passing therethrough. Similarly, as shown in FIG. 25, the single toroidal element 17 defines a circular shape in the imaginary horizontal geometric plane passing therethrough. As shown in FIG. 26, inventive practice also permits noncircular (oval, e.g., elliptical) planar configurations of a complete toroidal element 17 or of a plurality of toroidal segment elements 17s. In this regard, ring-shaped actuator 20 and planarly round sensor 22 can each be characterized by either a circular planar shape (such as shown in FIG. 25) or a noncircular planar shape (such as shown in FIG. 26). Note that practically any plural number of segmented torus-shaped streamlined resilient elements, such as elements 17s shown in FIG. 26, can be implemented in accordance with the present invention. Moreover, such segmented torus-shaped elements can be similar or dissimilar in size and/or shape, and in various combinations.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A mount suitable for passive-active vibration isolation in association with variable loading; said mount comprising a first member for attaching to a first entity, a second member for attaching to a second entity, at least one streamlined resilient element a sensor and an actuator; said actuator approximately being characterized by an annular shape, a geometric circumference and a geometric center; said sensor being positioned approximately at said geometric center of said actuator; said actuator and said sensor sharing approximately the same functional direction; each of said at least one streamlined resilient element at least substantially consisting of an at least substantially solid elastomeric material; each of said at least one streamlined resilient element being interposed between said first member and said second member so as to be connected to said second member at a position corresponding to the interior of said geometric circumference; said first member approximately describing a fist geometric plane; said second member approximately describing a second geometric plane that is approximately parallel to said first geometric plane; each of said at least one streamlined resilient element at least substantially describing a curved profile in a third geometric plane which perpendicularly intersects said first geometric plane and said second geometric plane; each of said at least one streamlined resilient element being characterized by low dynamic load transmisibility of vibration in a passivity-related frequency bandwidth over a broad range of loading to which said streamlined resilient element is being subjected; said passivity-related frequency bandwith being approximately the same with respect to each of said at least one streamlined resilient element; each of said at least one streamlined resilient element being characterized by nonlinear deflection when subjected to said loading; each of said at least one streamlined resilient element being predisposed to passively reducing vibration at said passivity-related frequency bandwith regardless of the extent of said loading, within said range, to which said streamlined resilient element is being subjected; said at least one streamlined resilient element thereby being capable of effectuating overall passive reduction of the transmission of vibration from said first member to said second member; said overall passive reduction being of vibration in approximately said passivity-related frequency bandwidth over a broad loading range of said first entity; said sensor being capable of generating a sensor signal; said actuator being capable of generating an actuator vibratory force; said sensor signal being representative of the vibration of said second member and being representable as a control signal; said actuator vibratory force being representative of said control signal; the combination including said sensor and said actuator thereby being capable of effectuating active reduction of the transmission of vibration which has reached said second member subsequent to the effectuating of said overall passive reduction; said active reduction being of vibration in an activity-related frequency bandwidth, said activity-related frequency bandwith differing from said passivity-related frequency bandwidth.

2. A mount as recited in claim 1, wherein at least one of said at least one streamlined resilient element includes at least one truncation surface, each of said at least one truncation surface adjoining one of said first member and said second member.

3. A mount as recited in claim 1, wherein each of said at least one streamlined resilient element at least substantially describes a shape which is selected from the group consisting of sphere, prolate spheroid, cylinder, torus and torus segment, and wherein:

each of said at least one streamlined resilient element that at least substantially describes a cylinder shape approximately defines a longitudinal axis that is approximately parallel to said first geometric plane and said second geometric plane;

each of said at least one streamlined resilient element that at least substantially describes a torus shape approximately defines a geometric torus plane that is approximately parallel to said first geometric plane and said second geometric plane; and each of said at least one streamlined resilient element that at least substantially describes a torus segment shape approximately defines a geometric longitudinal torus segment axis that lies in a geometric torus segment plane that is approximately parallel to said first geometric plane and, said second geometric plane.

4. A mount as recited in claim 3, wherein at least one of said at least one streamlined resilient element includes at least one truncation each of said at least one truncation surface adjoining one of said first member and said second member.

5. A mount as recited in claim 1, wherein said broad loading range associated with said overall passive reduction is between a minimum load value and a multiple load value of the minimum load value, and wherein said multiple load value is between approximately ten times and approximately one hundred times said minimum load value.

6. A mount as recited in claim 1, wherein at least one of said at least one streamlined resilient element at least substantially describes a torus shape that approximately defines a geometric torus plane and a geometric torus axis of symmetry, wherein:

said geometric torus plane is approximately parallel to said first geometric plane and said second geometric plane;

said geometric torus axis of symmetry is approximately perpendicular to said first geometric plane, said second geometric plane and said geometric torus plane; and said geometric torus axis of symmetry approximately passes through said geometric center of said actuator.

7. A mount as recited in claim 1, wherein at least two of said at least one streamlined resilient element each at least substantially describe a torus segment shape so as to, in aggregation, approximately describe a torus shape that defines a geometric torus plane and a geometric torus axis of symmetry, wherein:

said geometric torus plane is approximately parallel to said first geometric plane and said second geometric plane;

said geometric torus axis of is approximately perpendicular to said first geometric plane said second geometric plane and said geometric torus plane; and said geometric torus axis of symmetry approximately passes through said geometric center of said actuator.

8. A vibration isolator which is adaptable for engagement with a processor/controller, said processor/controller being capable of generating a control signal, said vibration isolator comprising:

a spring assembly which includes a top member for securing said spring assembly with respect to an isolated entity, a bottom member for said spring assembly with respect to an isolatee entity, and at least one interposed streamlined resilient element, each of said at least one interposed streamlined resilient element being at least substantially solid and at least substantially composed of an elastomeric material, said top member approximately describing an imaginary top plane, said bottom member approximately describing an imaginary bottom plane which is approximately parallel to said imaginary top plane, each of said at least one interposed streamlined resilient element at least substantially describing a curved profile in an imaginary elemental plane which perpendicularly intersects said imaginary top plane and said imaginary bottom plane, each of said at least one interposed streamlined resilient element having the property of passively reducing vibration within a special passive-reduction-related frequency bandwidth which is at least substantially constant when said in interposed streamlined resilient element is subjected to a wide range in terms of the degree of loading, each of said at least one interposed streamlined resilient element having the property of nonlinear deflection when subjected to a degree of said loading with said wide range, each of said at least one interposed streamlined resilient element passively reducing vibration at least substantially within said special passive-reduction-related frequency bandwidth regardless of the degree of said loading within said wide range, said at least one interposed streamlined resilient element thereby being capable in net effect of passively reducing vibration within a general passive-reduction-related frequency bandwidth which is approximately commensurate with said special passive-reduction-related bandwidth and which is at least substantially constant when said at least one interposed streamlined resilient element is subjected to a wide range in terms of the degree of loading which is associated with at least one of said isolated entity and said isolatee entity;

a sensor which is coupled with said bottom member and which is capable of generating a sensor signal which is in accordance with the vibration in said bottom member; and an approximately ring-shaped actuator which is coupled with said bottom member and which is approximately concentrically paired with said sensor so that said sensor and said actuator are approximately characterized by a common operational direction, said actuator being capable of generating in said bottom member a vibratory force which is in accordance with said control signal, wherein said control signal is in accordance with said sensor signal which is generated by said sensor, wherein said vibratory force has the tendency of actively reducing vibration within an active-reduction-related frequency bandwidth which differs from said general passive-reduction-related bandwidth, wherein said actuator approximately describes an imaginary cylindrical actuator shape having an imaginary cylindrical actuator axis which perpendicularly intersects said imaginary top plane and said imaginary bottom plane, and wherein said at least one interposed streamlined resilient element is positioned at least substantially inside said imaginary cylindrical actuator shape which is approximately described by said actuator.

9. A vibration isolator as defined in claim 8, wherein at least one of said at least one interposed streamlined resilient element includes at least one truncation surface, each said truncation surface adjoining one of said top member and said bottom member.

10. A vibration isolator as defined in claim 8, wherein:

to at least a substantial degree, each said interposed streamlined resilient element has a shape which is selected from the group consisting of spherical, prolate spheroidal, cylindrical, toroidal and segmentedly toroidal;

said interposed streamlined resilient element having a cylindrical shape approximately defines an imaginary central cylindrical elemental axis which is approximately intermediate and approximately parallel to said imaginary top plane and said imaginary bottom plane;

said interposed streamlined resilient element having a toroidal shape approximately defines an imaginary toroidal elemental plane which is approximately intermediate and approximately parallel to said imaginary top plane and said imaginary bottom plane; and said interposed streamlined resilient element having a segmentedly toroidal shape approximately defines an imaginary central axis which lies in imaginary segmentedly torroidal elemental plane which is approximately intermediate and approximately parallel to said imaginary top plane and said imaginary bottom plane.

11. A vibration isolator as defined in claim 10, wherein at least one of said at least one interposed streamlined resilient element includes at least one truncation surface, each said truncation surface adjoining one of said top member and said bottom member.

12. A vibration isolator as defined in claim 8, wherein said wide range, in terms of the degree of loading which is with at least one of said isolated entity and said isolatee entity, is approximately a range which is between a minimum loading value and a maximum loading value, said maximum loading value being between ten times and one hundred times said minimum loading value.

13. A vibration isolation system; said vibration isolation system being for reducing the transmission of vibration of a first entity to a second entity, said vibration isolation system comprising a spring assembly and a feedback loop system; said spring assembly being for effectuating passive vibration control; said feedback loop system being for effectuating active vibration control subsequent to said effectuating of said passive vibration control, said spring assembly including a first securement member, a second securement member and at least one streamlined resilient element; each of said at least one streamlined resilient element being situated between and, adjoining said first securement member and said second securement member; said first securement member being for securing said spring assembly with respect to said first entity; said second securement member being for securing said spring assembly with respect to said second entity, each of said at least one streamlined resilient member being essentially solid and essentially elastomeric; said at least one streamlined resilient element passively reducing the transmission of vibration of said first entity to said second entity, each of said at least one streamlined resilient element being characterized by nonlinear deflection when subjected to loading; said first securement member approximately describing a first geometric plane; said second securement member approximately describing a second geometric plane which is approximately parallel to said first geometric plane; each of said at least one streamlined resilient element at least substantially describing a curved profile in a third geometric plane which perpendicularly intersects said first geometric plane and said second geometric plane; said passively reduced vibration existing in at least a first frequency bandwidth; said first frequency bandwidth being generally constant within a broad scope of the amount of loading upon said at least one streamlined resilient element by at least one of said first entity and said second entity; said at least one streamlined resilient element passively reducing vibration in said at least a first frequency bandwith regardless of the amount of loading upon said at least one streamlined element within said broad scope of the amount of loading said feedback loop system including a sensor, a PID controller and an annular actuator, said sensor being coupled with said second securement member, said sensor generating a sensor signal which is a function of the vibration in said second securement member; said PID controller generating a control signal which is a function of said sensor signal; said annular actuator being coupled with said second securement member; said annular actuator generating, in said second securement member, a vibratory force which is a function of said control signal; said annular actuator, by said generating, actively reducing die transmission of vibration of said first entity to said second entity, said actively reduced vibration existing in at least a second frequency bandwidth; said at least a first frequency bandwidth and said at least a second frequency bandwidth being generally dissimilar, said sensor and said annular actuator being approximately coaxially situated whereby the sensing of said sensor and the actuation of said actuator are approximately in the same direction; each of said at least one streamlined resilient element adjoining said second securement member at a location circumscribed by said annular actuator.

14. The vibration isolation system according to claim 13, wherein at least one of said at least one streamlined resilient element at least substantially defines a spherical shape that is approximately coaxially situated with respect to said annular actuator.

15. The vibration isolation system according to claim 13, wherein at least one of said at least one streamlined resilient element at least substantially defines a prolate spheroidal shape that is approximately coaxially situated with respect to said annular actuator.

16. The vibration isolation system according to claim 13, wherein at least one of said at least one streamlined resilient element at least substantially defines a shape that is approximately coaxially situated with respect to said annular actuator.

17. The vibration isolation system according to claim 13, wherein at least two of said at least one streamlined resilient element each at least substantially define a segmented torus shape and are situated so as to together approximately describe a torus shape that is approximately coaxially situated with respect to said annular actuator.

18. The vibration isolation system according to claim 13, wherein at least one of said at least one streamlined resilient element includes at least one truncation surface, each said truncation surface adjoining one of said first securement member and said second securement member.

19. The vibration isolation system according to claim 13, wherein said broad scope of the amount of loading approximately ranges between a minimum loading amount and a maximum loading amount, and wherein said maximum loading amount is approximately between ten times and one hundred times said minimum loading amount.

20. The vibration isolation system according to claim 13, wherein at least one of said at least one streamlined resilient element at least substantially defines a cylindrical shape.

21. The vibration isolation system according to claim 13, wherein said at least one streamlined resilient element is approximately symmetrical with respect to the geometric axis with respect to which said sensor and said annular actuator are approximately coaxially situated.

22. Apparatus for both passively and actively isolating the vibration of a structure situated over a foundation, said apparatus comprising:
   a processor/controller;
   a spring device which passively reduces the transmission of said vibration from said structure to said foundation, said spring device including an upper member for fixing said spring device with respect to said structure, a lower member for fixing said spring device with respect to said foundation, and at least one streamlined resilient element, wherein:
      each of said at least one streamlined resilient element is solid and elastomeric and is so configured as to at least substantially exhibit the attribute of effecting passive reduction of the vibration existing at least nearly the identical frequency band over a significant range of the degree of loading imposed upon said streamlined resilient element;
      each of said at least one streamlined resilient element has a configuration describing a curved profile in a third geometric plane which perpendicularly intersects a first geometric plane defined by said upper member and a second geometric plane defined by said lower member;
      said significant range is between a minimum degree of loading and a maximum degree of loading;
      each of said at least one streamlined resilient element is characterized by nonlinear deflection when a degree of said loading within said significant range is imposed upon said streamlined resilient element;
      said at least one streamlined resilient element effects passive reduction of vibration at least substantially within said significant range regardless of the degree of loading within said wide range, imposed upon said at least one streamlined resilient element;
      said maximum degree of loading is no less than about ten times said minimum degree of loading;
      said maximum degree of loading is no more than about one hundred times said minimum degree of loading; and
      each of said at least one streamlined resilient element is so configured as to at least substantially describe one of a spheroid a prolate spheroid, a cylinder, a torus and a torus segment; and
   the combination including a sensor and an annular actuator wherein:
      said sensor and said actuator are each coupled with said lower member so that said sensor and said actuator are approximately aligned both centrically and directionally, and so that said actuator encompasses an area of said lower member;

said at least one streamlined resilient element is coupled with said upper member and is coupled with said lower member within said area of said lower member that is encompassed by said actuator;

said sensor senses the local vibration in a portion of said lower member and produces an electrical sensor signal commensurate with said local vibration;

said processor/controller receives said electrical sensor signal from said sensor and produces an electrical control signal commensurate with said electrical sensor signal; and said actuator receives said electrical control signal from said processor/controller and produces in said portion of said lower member a vibratory force commensurate with said electrical control signal said vibratory force increasing the stability of said portion of said lower member, said actuator thereby effecting active reduction of the transmission of said vibration from said structure to said foundation whereby, in succession, said spring device passively reduces the transmission of said vibration and said actuator actively reduces the transmission of said vibration.

23. The apparatus according to claim 22, wherein at least one of said at least one streamlined resilient element is at least slightly truncated for facilitating connection to said upper member.

24. The apparatus according to claim 22, wherein said at least one streamlined resilient element is characterized by approximate symmetry about a geometric line, wherein said geometric line:

is perpendicular to said first geometric plane and said second geometric plane; and intersects a geometric point of said lower member corresponding to said approximate alignment of said sensor and said actuator.

25. A method for reducing transmission of vibration of a first entity to a second entity, said method comprising:

providing a spring assembly which includes at least one streamlined resilient element, an upper securement member and a lower securement member, said at least one streamlined resilient element being situated between and attached to said upper securement member and said lower securement member, said at least one streamlined resilient element being essentially solid and essentially elastomeric and being for passively reducing the transmission of vibration existing in at least a first plurality of frequencies, said first plurality of frequencies falling within a generally constant bandwidth in relation to a range of loading imposed upon said at least one streamlined resilient element by at least one of said first entity and said second entity, said range being between a minimum degree of loading and a maximum degree of loading, said upper securement member approximately describing a first geometric plane; said lower securement member approximately describing a second geometric plane, said first geometric plane and said second geometric plane being approximately parallel, each of said at least one streamlined resilient element being shaped so as to at least substantially describe a curved profile in a third geometric plane which perpendicularly intersects said first geometric plane and said second, geometric plane, each of said at least one streamlined resilient element being characterized by nonlinear deflection when a degree of loading within said range is imposed upon said streamlined resilient element, said at least one streamlined resilient element effecting passive reduction of vibration at least substantially within said range regardless of the degree of loading within said range imposed upon said at least one streamlined resilient element; said maximum degree of loading being no less than about ten times said minimum degree of loading, said maximum degree of loading being no more than about one hundred times said minimum degree of loading, each of said at least one streamlined resilient element being shaped so as to at least substantially describe one of a sphere, a prolate spheroid, a cylinder, a torus and a torus segment; and engaging with said spring assembly a feedback loop system, said engaging including:

approximately concentrically attaching a sensor and a generally ring-shaped vibratory actuator to said lower securement member so that said sensor senses and said vibratory actuator actuates in approximately the same direction, and so that the attachment of said at least one streamlined resilient element to said lower securement member exists within the region of said lower securement member that is delimited by the attachment of said vibratory actuator to said lower securement member;

connecting said sensor and said vibratory actuator with a processor/controller so that said sensor generates a sensor signal representative of the vibration of said lower securement member, said processor-controller generates a control signal representative of said sensor signal, and said vibratory actuator generates a vibratory force representative of said control signal; and providing power for said feedback loop system; and mounting said first entity with respect to said second entity, said mounting including fasting said first entity with respect to said upper securement member and fastening said second entity with respect to said lower securement member;

wherein, in series, said spring assembly effects passive reduction of said vibration at said first plurality of frequencies, then said feedback loop system effects active reduction of said vibration at a second plurality of frequencies; and wherein at least one frequency among said second plurality of frequencies is not among said first plurality of frequencies.

26. A method for reducing transmission of vibration as recited in claim 25, wherein said providing a spring assembly includes;

providing a streamlined resilient element which has a first truncation surface and a second truncation surface opposite said first truncation surface; and joining said streamlined resilient element with each of said upper securement member and said lower securement member so that said first truncation surface abuts said upper securement member, and so that said second truncation surface abuts said lower securement member.

27. A method for reducing transmission of vibration as recited in claim 26, wherein said providing a streamlined resilient element includes effecting said first truncation surface and effecting said second truncation surface.

* * * * *